(12) United States Patent
Hwang et al.

(10) Patent No.: US 11,558,921 B2
(45) Date of Patent: Jan. 17, 2023

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Jaehyuk Jang, Suwon-si (KR); Anil Agiwal, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/535,414

(22) Filed: Aug. 8, 2019

(65) Prior Publication Data

US 2020/0053825 A1 Feb. 13, 2020

(30) Foreign Application Priority Data

Aug. 8, 2018 (KR) .................. 10-2018-0092679

(51) Int. Cl.
*H04W 76/28* (2018.01)
*H04W 72/04* (2009.01)
*H04W 76/38* (2018.01)

(52) U.S. Cl.
CPC ....... *H04W 76/28* (2018.02); *H04W 72/0453* (2013.01); *H04W 76/38* (2018.02)

(58) Field of Classification Search
CPC . H04W 76/28; H04W 72/0453; H04W 76/38; H04W 28/0278; H04W 28/10; H04W 76/27; H04W 72/0493; Y02D 30/70
See application file for complete search history.

(56) References Cited

U.S. PATENT DOCUMENTS

| 2014/0295820 A1* | 10/2014 | Kim ................. H04W 52/0225 |
| | | 455/418 |
| 2016/0044708 A1 | 2/2016 | Lin et al. |
| 2017/0164421 A1 | 6/2017 | Marinier et al. |
| 2017/0353928 A1 | 12/2017 | Kim et al. |
| 2018/0220345 A1 | 8/2018 | Moon et al. |

(Continued)

FOREIGN PATENT DOCUMENTS

CN 107483710 A 12/2017

OTHER PUBLICATIONS

International Search Report dated Nov. 21, 2019, issued in an International Application No. PCT/KR2019/009890.

(Continued)

*Primary Examiner* — Edan Orgad
*Assistant Examiner* — Malick A Sohrab
(74) *Attorney, Agent, or Firm* — Jefferson IP Law, LLP

(57) ABSTRACT

A method of performing a discontinuous reception (DRX) operation by a user equipment (UE) is provided. The method includes receiving bandwidth part (BWP) configuration information and DRX configuration information, configuring a duration of a timer for the DRX operation, based on the BWP configuration information and the DRX configuration information, and controlling the timer to perform the DRX operation, based on the configured duration, wherein the timer for the DRX operation is controlled before the timer is stopped or expires.

12 Claims, 23 Drawing Sheets

(56) References Cited

U.S. PATENT DOCUMENTS

2019/0158229 A1* 5/2019 Wei .................. H04W 76/28
2020/0037247 A1* 1/2020 Liao ................ H04W 52/0216
2020/0045745 A1* 2/2020 Cirik .................. H04B 7/0695
2021/0022080 A1* 1/2021 Chang ................ H04W 52/028

OTHER PUBLICATIONS

Ericsson, 'BWP switch during numerology dependent DRX timers', R2-1810054, 3GPP TSG-RAN WG2 AH 1807, Jun. 22, 2018; Montreal, Canada. See section 2.2.

Huawei et al., 'Impacts on DRX Retransmission Timers and HARQ RTT Timers during BWP Switching', R2-1809572, 3GPP TSG-RAN WG2 NR AH1807; Jun. 22, 2018; Montreal, Canada. See section 2.

Oppo et al., UE behaviour on DRX timer operation, R2-1801763, 3GPP TSG-RAN2 #101, Feb. 14, 2018, Athens, Greece, XP051398993.

Interdigital Inc., C-DRX with Multiple Configurations, R2-1706683, 3GPP TSG-RAN WG2 NR AH#2, Jun. 26, 2017, Qingdao, P.R. China, XP051301183.

Huawei et al., Clarification on timer handling during BWP swtiching, R2-1809573, 3GPP TSG-RAN2 Meeting # NR AH1807, Jun. 22, 2018, Montreal, Canada, XP051466849.

Qualcomm Incorporated, BWP operation in C-DRX, R2-1805749, 3GPP TSG-RAN WG2 Meeting #101 bis, Apr. 14, 2018, Sanya, China, XP051429374.

European Search Report dated Jul. 5, 2021, issued in European Application No. 19847168.2.

* cited by examiner

METHOD AND APPARATUS FOR TRANSMITTING AND RECEIVING DATA IN WIRELESS COMMUNICATION SYSTEM

CROSS-REFERENCE TO RELATED APPLICATION(S)

This application is based on and claims priority under 35 U.S.C. § 119 of a Korean patent application number 10-2018-0092679, filed on Aug. 8, 2018, in the Korean Intellectual Property Office, the disclosure of which is incorporated by reference herein in its entirety.

BACKGROUND

1. Field

The disclosure relates to a method and apparatus for transmitting and receiving data in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

Because various services may be provided due to the development of mobile communication systems, methods capable of effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing services in a mobile communication system.

Additional aspects will be set forth in part in the description which follows and, in part, will be apparent from the description, or may be learned by practice of the presented embodiments.

In accordance with an aspect of the disclosure, a method of performing a discontinuous reception (DRX) operation by a user equipment (UE) is provided. The method includes receiving bandwidth part (BWP) configuration information and DRX configuration information, configuring a duration of a timer for the DRX operation, based on the BWP configuration information and the DRX configuration information, and controlling the timer to perform the DRX operation, based on the configured duration, wherein the timer for the DRX operation is controlled before the timer is stopped or expires.

The configured duration may not be updated after the timer starts and before the timer is stopped or expires.

The timer may include a first type timer and a second type timer, and a duration of the first type timer may be configured based on an absolute time unit, and a duration of the second type timer may be configured based on a BWP used for data transmission and reception.

The first type timer may include at least one of an on-duration timer, a shortDRXcycle timer, or a drx-inactivity timer, and the second type timer may include at least one of a drx-RetransmissionTimerDL or a drx-RetransmissionTimerUL.

Durations of the drx-RetransmissionTimerDL and the drx-RetransmissionTimerUL may be configured based on a slot duration of the BWP used for data transmission and reception.

The method may further include receiving physical downlink control channel (PDCCH) data for BWP switching, performing BWP switching based on the PDCCH data, and updating the configured duration of the timer based on the BWP switching.

The updating may include not updating the duration of the timer before the timer is stopped or expires.

In accordance with another aspect of the disclosure, a method of performing a discontinuous reception (DRX) operation by a base station is provided. The method includes transmitting bandwidth part (BWP) configuration information and DRX configuration information to a user equipment (UE), and transmitting physical downlink control channel (PDCCH) data to the UE based on a duration of a timer of the UE, the duration being configured based on the BWP configuration information and the DRX configuration information, wherein the duration of the timer is not updated after the timer starts and before the timer is stopped or expires.

The timer may include a first type timer and a second type timer, and a duration of the first type timer may be configured based on an absolute time unit in the DRX configuration information, and a duration of the second type timer may be configured based on a BWP used for data transmission and reception.

The first type timer may include at least one of an on-duration timer, a shortDRXcycle timer, or a drx-inactivity timer, and the second type timer may include at least one of a drx-RetransmissionTimerDL or a drx-RetransmissionTimerUL.

In accordance with another aspect of the disclosure, a user equipment (UE) for performing a discontinuous reception (DRX) operation is provided. The user equipment includes a transceiver, and a controller coupled with the transceiver and configured to receive bandwidth part (BWP) configuration information and DRX configuration information, configure a duration of a certain timer for the DRX operation, based on the BWP configuration information and the DRX configuration information, and control the timer to perform the DRX operation, based on the configured duration, wherein the timer for the DRX operation is controlled before the timer is stopped or expires.

The configured duration may not be updated after the timer starts and before the timer is stopped or expires.

The timer may include a first type timer and a second type timer, and a duration of the first type timer may be configured based on an absolute time unit, and a duration of the second type timer may be configured based on a BWP used for data transmission and reception.

The first type timer may include at least one of an on-duration timer, a shortDRXcycle timer, or a drx-inactivity timer, and the second type timer may include at least one of a drx-RetransmissionTimerDL or a drx-RetransmissionTimerUL.

Durations of the drx-RetransmissionTimerDL and the drx-RetransmissionTimerUL may be configured based on a slot duration of the BWP used for data transmission and reception.

The controller may be further configured to receive physical downlink control channel (PDCCH) data for BWP switching, perform BWP switching based on the PDCCH data, and update the configured duration of the timer based on the BWP switching.

The controller may be further configured not to update the duration of the timer before the timer is stopped or expires.

In accordance with another aspect of the disclosure, a base station for performing a discontinuous reception (DRX) operation is provided. The base station includes a transceiver, and a controller coupled with the transceiver and configured to transmit bandwidth part (BWP) configuration information and DRX configuration information to a user equipment (UE), and transmit physical downlink control channel (PDCCH) data to the UE based on a duration of a timer of the UE, the duration being configured based on the BWP configuration information and the DRX configuration information, wherein the duration of the timer is not updated after the timer starts and before the timer is stopped or expires.

The timer may include a first type timer and a second type timer, and a duration of the first type timer may be configured based on an absolute time unit in the DRX configuration information, and a duration of the second type timer may be configured based on a BWP used for data transmission and reception.

The first type timer may include at least one of an on-duration timer, a shortDRXcycle timer, or a drx-inactivity timer, and the second type timer may include at least one of a drx-RetransmissionTimerDL or a drx-RetransmissionTimerUL.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
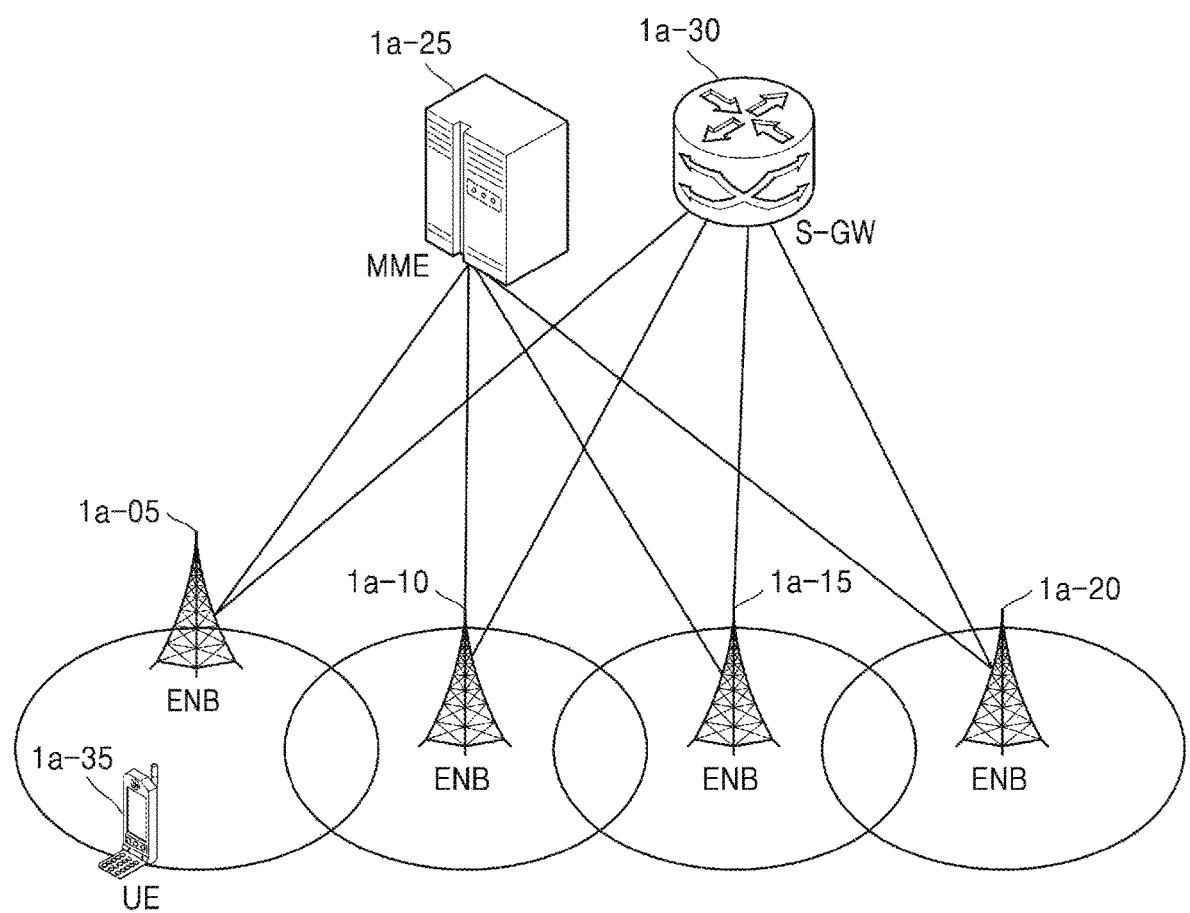
FIG. 1A is a schematic diagram of a long term evolution (LTE) system according to an embodiment of the disclosure.

The following described with reference to the accompanying drawings is provided to assist in a comprehensive understanding of various embodiments of the disclosure as defined by the claims and their equivalents. It includes various specific detailed to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

Throughout the disclosure, the expression "at least one of a, b or c" indicates only a, only b, only c, both a and b, both a and c, both b and c, all of a, b, and c, or variations thereof.

In the following description of the disclosure, a detailed description of known functions and configurations incorporated herein will be omitted when it may make the subject matter of the disclosure unclear. Hereinafter, the disclosure will be described in detail by explaining embodiments of the disclosure with reference to the attached drawings.

In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used. For example, as used herein, a user equipment (UE) may indicate a media access control (MAC) entity in a UE in each of a master cell group (MCG) and a secondary cell group (SCG). Throughout the specification, a layer may also be referred to as an entity.

To facilitate explanation, the disclosure uses terms and names defined in the $3^{rd}$ Generation Partnership Project (3GPP) long term evolution (LTE) communication standards. However, the disclosure is not limited to these terms and names and may be equally applied to systems conforming to other standards.

In the following description, a base station is an entity for assigning resources for a user equipment (UE) and may include at least one of a gNode B (gNB), an eNode B (eNB), a Node B (NB), a base station (BS), a radio access unit, a base station controller, or a node on a network. A user equipment may include a user equipment (UE), a mobile station (MS), a mobile terminal (MT), a cellular phone, a smart phone, a computer, or a multimedia system capable of performing communication functions. However, the base station and the user equipment are not limited to the above-mentioned examples.

In particular, the disclosure is applicable to 3GPP new radio (NR) (or $5^{th}$ generation (5G)) mobile communication standards. The disclosure is applicable to intelligent services (e.g., smart home, smart building, smart city, smart car or connected car, healthcare, digital education, retail trade, security, and safety services) based on 5G communication technologies and Internet of things (IoT)-related technologies. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The UL refers to a radio link for transmitting data or a control signal from a UE (or a MS) to a base station (e.g., an eNB or a BS), and the DL refers to a radio link for transmitting data or a control signal from the base station to the UE. The above-described dual connectivity schemes distinguish between data or control information of different users by assigning time-frequency resources for the data or control information of the users not to overlap each other, i.e., to achieve orthogonality therebetween.

As post-LTE systems, 5G systems need to support services capable of simultaneously reflecting and satisfying various requirements of users, service providers, etc. Services considered for the 5G systems include enhanced mobile broadband (eMBB), massive machine-type communication (mMTC), and ultra-reliability low-latency communication (URLLC) services.

The eMBB service may be aimed to provide an enhanced data rate compared to a data rate supported by LTE, LTE-Advanced (LTE-A), or LTE-Pro. For example, the eMBB service in the 5G systems need to provide a peak data rate of 20 gigabits per second (Gbps) for a DL and provide a peak data rate of 10 Gbps for a UL in view of a single base station. At the same time, the 5G systems may provide an increased user perceived data rate. To satisfy these requirements, the 5G systems may require various enhanced transmission/reception technologies including enhanced multiple-input and multiple-output (MIMO). The data rate required for the 5G systems may be satisfied by using a frequency bandwidth wider than 20 megahertz (MHz) in a frequency band of 3 to 6 gigahertz (GHz) or over 6 GHz compared to LTE systems currently using a transmission bandwidth of up to 20 MHz in a 2 GHz band.

At the same time, the mMTC service is considered for the 5G systems to support application services such as the Internet of things (IoT). The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$. In addition, because UEs supporting mMTC may be located in a shadow zone, e.g., a basement of a building, due to service characteristics, the mMTC service may require a wider coverage compared to other services provided by the 5G systems. The UEs supporting mMTC need to be low-priced, and are not able to frequently replace batteries and thus require a very long battery lifetime, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may provide a very low latency (e.g., ultra-low latency) and a very high reliability (e.g., ultra-reliability). For example, the URLLC service needs to satisfy an air interface latency less than 0.5 millisecond (ms) and, at the same time, may require a packet error rate equal to or less than $10^{-5}$. Therefore, for the URLLC service, the 5G systems need to provide a smaller transmit time interval (TTI) compared to other services and, at the same time, may be required to assign wide resources in a frequency band to ensure reliability of a communication link.

The above-described three services considered for the 5G systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, various embodiments of the disclosure may also be applied to other communication systems having similar technical backgrounds or channel types. Furthermore, the various embodiments of the disclosure may also be applied to other communication systems through partial modification without greatly departing from the scope of the disclosure based on determination of one of ordinary skill in the art.

As used herein, integrated access and backhaul (IAB) refers to a technology by which one node serves as a sort of a relay node to operate as a mobile terminal (MT) for a parent IAB node and operate as a base station for a child IAB node, and thus collects UL traffic data from a child IAB node and UL traffic data of a normal UE accessed the one node, to transmit the collected data to a parent IAB node as UL traffic data, and transmit DL traffic data from a core network, to a child IAB node thereof or a normal UE accessed the one node, as DL traffic data. That is, IAB refers to a node capable of performing an integrated access and backhaul communication operation by communicating with a parent IAB node and a child IAB node, and a system of a topology including the node. A node directly connected to a core network is defined as an IAB donor, and the IAB donor does not have a parent IAB node and is connected to the core network by using an Internet protocol (IP) address system.

When communication is performed between a core network and UEs in a topology including multiple hops of IAB nodes, use of radio resources of each IAB node is mainly associated with independent scheduling operation of the node, and thus DL and UL buffers of each IAB node may overflow or not depending on a radio resource status of the IAB node, the number of UEs currently accessed the IAB node, and the amount of DL/UL traffic data from a parent/child IAB node. In particular, buffer overflow may cause data loss due to discarded data packets of the IAB node, and thus lead to a serious problem in a whole IAB operation. A buffer status report (BSR) method from a UE to prevent buffer overflow at each hop in a system including multiple hops of IAB nodes will now be described.

FIG. 1A is a schematic diagram of an LTE system according to an embodiment of the disclosure.

Referring to FIG. 1A, a radio access network of the LTE system may include a plurality of evolved nodes B (ENBs) (or nodes B or base stations) 1a-05, 1a-10, 1a-15, and 1a-20, a mobility management entity (MME) 1a-25, and a serving-gateway (S-GW) 1a-30. A user equipment (UE) (or a mobile station) 1a-35 may access an external network via the ENB 1a-05, 1a-10, 1a-15, or 1a-20 and the S-GW 1a-30.

Referring to FIG. 1A, the ENB 1a-05, 1a-10, 1a-15, or 1a-20 may correspond to an existing node B of a universal mobile telecommunications system (UMTS). The ENB 1a-05, 1a-10, 1a-15, or 1a-20 may be connected to the UE 1a-35 through wireless channels and perform complex functions compared to the existing node B. All user traffic data including real-time services such as voice over Internet protocol (VoIP) may be serviced through shared channels in the LTE system. Therefore, an entity for collating status information, e.g., buffer status information, available transmit power status information, and channel status information, of UEs and performing scheduling may be required and the ENB 1a-05, 1a-10, 1a-15, or 1a-20 may operate as such an entity. One ENB may generally control a plurality of cells. For example, the LTE system may use radio access technology such as orthogonal frequency division multiplexing (OFDM) at a bandwidth of 20 MHz to achieve a data rate of 100 Mbps. The ENB may also use adaptive modulation & coding (AMC) to determine a modulation scheme and a channel coding rate in accordance with a channel status of the UE 1a-35. The S-GW 1a-30 is an entity for providing data bearers and may establish and release the data bearers under the control of the MME 1a-25. The MME 1a-25 is an entity for performing a mobility management function and various control functions on the UE 1a-35 and may be connected to the plurality of ENBs 1a-05, 1a-10, 1a-15, and 1a-20.

Figure 1B:
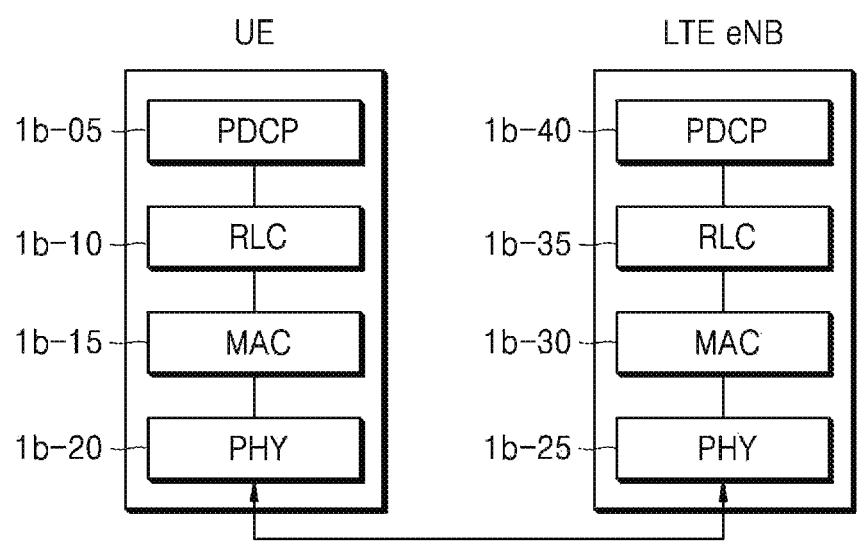
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an ENB. The PDCP layer 1b-05 or 1b-40 may be in charge of, for example, IP header compression/decompression. Main functions of the PDCP layer 1b-05 or 1b-40 may be summarized as shown below. However, the functions thereof are not limited thereto.

Header compression and decompression: robust header compression (ROHC) only
  Transfer of user data
  In-sequence delivery of upper layer packet data units (PDUs) at PDCP re-establishment procedure for RLC acknowledged mode (AM)
  For split bearers in DC (only support for RLC AM): PDCP PDU routing for transmission and PDCP PDU reordering for reception
  Duplicate detection of lower layer service data units (SDUs) at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink According to an embodiment of the disclosure, the RLC layer 1b-10 or 1b-35 may perform, for example, an automatic repeat request (ARQ) operation by reconfiguring PDCP PDUs to appropriate sizes. Main functions of the RLC layer 1b-10 or 1b-35 may be summarized as shown below. However, the functions thereof are not limited thereto.

Transfer of upper layer PDUs
  Error correction through ARQ (only for AM data transfer)
  Concatenation, segmentation and reassembly of RLC SDUs (only for unacknowledged mode (UM) and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment According to an embodiment of the disclosure, the MAC layer 1b-15 or 1b-30 may be connected to a plurality of RLC layers configured for one UE and multiplex RLC PDUs into a MAC PDU and demultiplex the RLC PDUs from the MAC PDU. Main functions of the MAC layer 1b-15 or 1b-30 may be summarized as shown below. However, the functions thereof are not limited thereto.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

According to an embodiment of the disclosure, a physical (PHY) layer 1b-20 or 1b-25 may channel-code and modulate upper layer data into OFDM symbols and transmit the OFDM symbols through a wireless channel, or demodulate OFDM symbols received through a wireless channel and channel-decode and deliver the OFDM symbols to an upper layer. However, the functions thereof are not limited thereto.

Figure 1C:
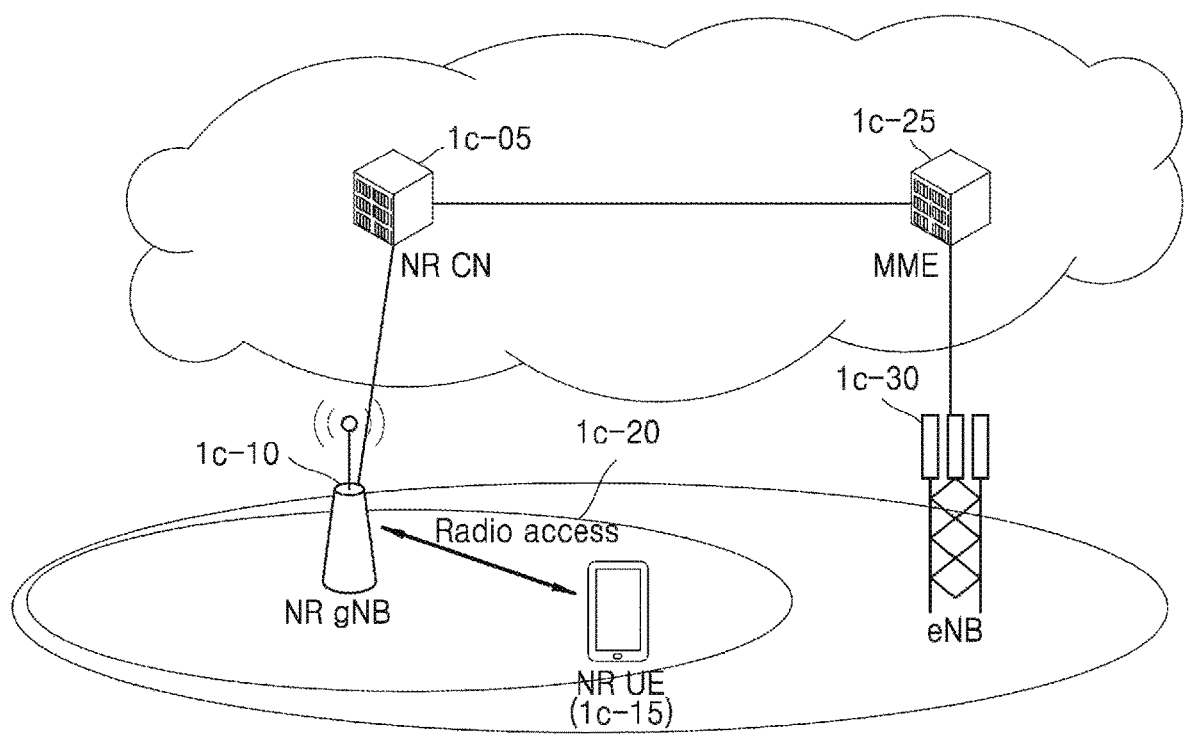
FIG. 1C is a schematic diagram of a new radio (NR) or $5^{th}$ generation (5G) system according to an embodiment of the disclosure.

FIG. 1C is a schematic diagram of a new radio (NR) or $5^{th}$ generation (5G) system according to an embodiment of the disclosure.

Referring to FIG. 1C, a radio access network of the NR or 5G system may include a new radio node B (NR gNB, NR NB, or gNB) 1c-10 and a new radio core network (NR CN) 1c-05. A new radio user equipment (NR UE) 1c-15 may access an external network via the NR gNB 1c-10 and the NR CN 1c-05.

Referring to FIG. 1C, the NR gNB 1c-10 may correspond to an existing evolved node B (eNB) of an LTE system. The NR gNB 1c-10 may be connected to the NR UE 1c-15 through wireless channels of a carrier 1c-20 and provide superior services compared to an existing node B. All user traffic data may be serviced through shared channels in the NR or 5G system. Therefore, an entity for collating, for example, buffer status information of UEs, available transmit power status information, and channel status information and performing scheduling may be required and the NR gNB 1c-10 may operate as such an entity. One NR gNB may control a plurality of cells. In the NR or 5G system, a bandwidth greater than the maximum bandwidth of the existing LTE system may be used to achieve an ultrahigh data rate. Beamforming technology may be additionally used by using orthogonal frequency division multiplexing (OFDM) as radio access technology.

According to an embodiment of the disclosure, the NR gNB 1c-10 may use adaptive modulation & coding (AMC) to determine a modulation scheme and a channel coding rate in accordance with a channel status of the NR UE 1c-15. The NR CN 1c-05 may perform functions such as mobility support, bearer configuration, and quality of service (QoS) configuration. The NR CN 1c-05 is an entity for performing a mobility management function and various control functions on the NR UE 1c-15 and may be connected to a plurality of base stations. The NR or 5G system may cooperate with the existing LTE system, and the NR CN 1c-05 may be connected to an MME 1c-25 through a network interface. The MME 1c-25 may be connected to an existing eNB 1c-30.

Figure 1D:
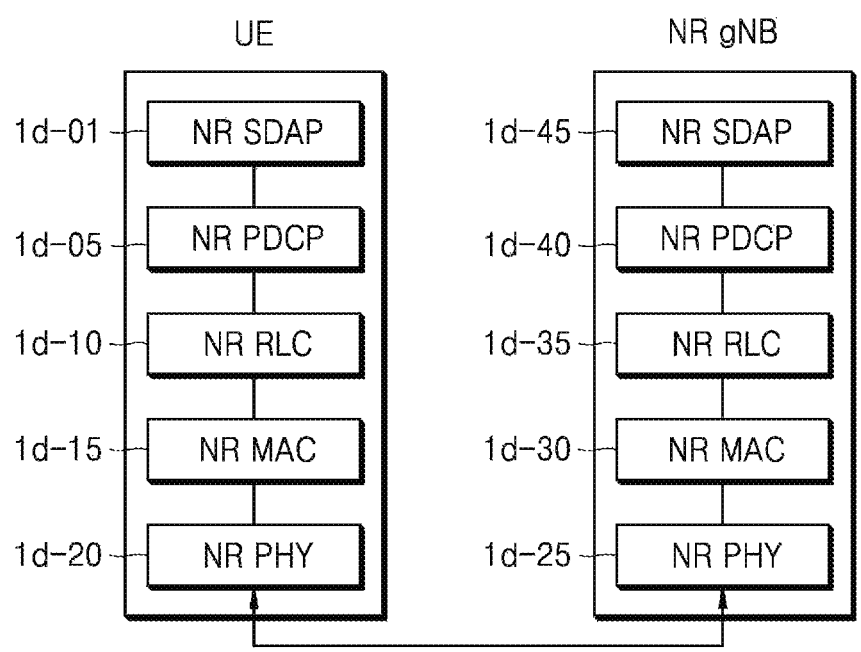
FIG. 1D is a diagram illustrating a radio protocol architecture of an NR or 5G system according to an embodiment of the disclosure.

FIG. 1D is a diagram illustrating a radio protocol architecture of an NR or 5G system according to an embodiment of the disclosure.

Referring to FIG. 1D, the radio protocol architecture of the NR or 5G system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

According to an embodiment of the disclosure, main functions of the NR SDAP entity 1d-01 or 1d-45 may include some of the following functions. However, the functions thereof are not limited thereto.

Transfer of user plane data

Mapping between a QoS flow and a data radio bearer (DRB) for both DL and UL

Marking QoS flow identifier (ID) in both DL and UL packets

Reflective QoS flow to DRB mapping for the UL SDAP PDUs

With regard to a SDAP layer, information about whether to use a header of the SDAP layer or to use functions of the SDAP layer may be configured for the UE by using a radio resource control (RRC) message per PDCP layer, per bearer, or per logical channel. When the SDAP header is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. According to an embodiment of the disclosure, the SDAP header may include QoS flow ID information indicating QoS. According to an embodiment of the disclosure, QoS information may be used as data processing priority information or scheduling information for appropriately supporting a service.

According to an embodiment of the disclosure, main functions of the NR PDCP layer 1d-05 or 1d-40 may include some of the following functions. However, the functions thereof are not limited thereto.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above-description, the reordering function of the NR PDCP layer 1d-05 or 1d-40 may refer to a function of reordering PDCP PDUs received from a lower layer, on a PDCP sequence number (SN) basis. The reordering function of the NR PDCP layer 1d-05 or 1d-40 may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs According to an embodiment of the disclosure, main functions of the NR RLC layer 1d-10 or 1d-35 may include some of the following functions. However, the functions thereof are not limited thereto.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, the in-sequence delivery function of the NR RLC layer 1d-10 or 1d-35 may refer to a function of delivering RLC SDUs received from a lower layer, to an upper layer in order. When a plurality of RLC SDUs segmented from one RLC SDU are received, the in-sequence delivery function of the NR RLC layer 1d-10 or 1d-35 may include a function of reassembling the RLC SDUs and delivering the reassembled RLC SDU.

The in-sequence delivery function of the NR RLC layer 1d-10 or 1d-35 may include a function of reordering received RLC PDUs on a RLC SN or PDCP SN basis, a function of recording missing RLC PDUs by reordering the received RLC PDUs, a function of reporting status information of the missing RLC PDUs to a transmitter, or a function of requesting to retransmit the missing RLC PDUs.

The in-sequence delivery function of the NR RLC layer 1d-10 or 1d-35 may include a function of delivering only RLC SDUs prior to a missing RLC SDU, to an upper layer in order when the missing RLC SDU exists.

The in-sequence delivery function of the NR RLC layer 1d-10 or 1d-35 may include a function of delivering all RLC SDUs received before a timer starts, to an upper layer in order although a missing RLC SDU exists when a certain timer expires.

The in-sequence delivery function of the NR RLC layer 1d-10 or 1d-35 may include a function of delivering all RLC SDUs received up to a current time, to an upper layer in order although a missing RLC SDU exists when a certain timer expires.

The NR RLC layer 1d-10 or 1d-35 may process the RLC PDUs in order of reception and deliver the RLC PDUs to the NR PDCP layer 1d-05 or 1d-40 regardless of SNs (out-of-sequence delivery).

When a segment is received, the NR RLC layer 1d-10 or 1d-35 may reassemble the segment with other segments stored in a buffer or subsequently received, into a whole RLC PDU and deliver the RLC PDU to the NR PDCP layer 1d-05 or 1d-40.

The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

In the above description, the out-of-sequence delivery function of the NR RLC layer 1d-10 or 1d-35 may refer to a function of directly delivering RLC SDUs received from a lower layer, to an upper layer out of order. The out-of-sequence delivery function of the NR RLC layer 1d-10 or 1d-35 may include a function of reassembling a plurality of RLC SDUs segmented from one RLC SDU and delivering the reassembled RLC SDU when the segmented RLC SDUs are received. The out-of-sequence delivery function of the NR RLC layer 1d-10 or 1d-35 may include a function of recording missing RLC PDUs by storing RLC SNs or PDCP SNs of received RLC PDUs and reordering the received RLC PDUs.

According to an embodiment of the disclosure, the NR MAC layer 1d-15 or 1d-30 may be connected to a plurality of NR RLC layers configured for one UE, and main functions of the NR MAC layer 1d-15 or 1d-30 may include some of the following functions. However, the functions thereof are not limited thereto.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

An NR PHY layer 1d-20 or 1d-25 may channel-code and modulate upper layer data into OFDM symbols and transmit the OFDM symbols through a wireless channel, or demodulate OFDM symbols received through a wireless channel and channel-decode and deliver the OFDM symbols to an upper layer.

Figure 1E:
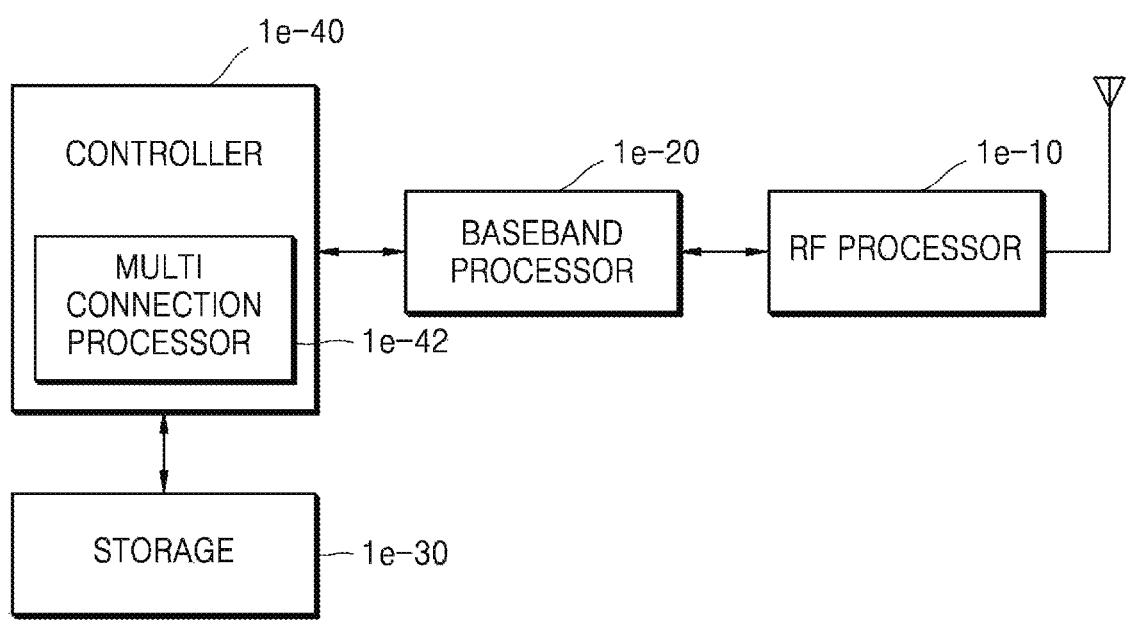
FIG. 1E is a block diagram of a user equipment (UE) according to an embodiment of the disclosure.

FIG. 1E is a block diagram of a UE according to an embodiment of the disclosure.

Referring to FIG. 1E, the UE includes a radio frequency (RF) processor 1e-10, a baseband processor 1e-20, a storage 1e-30, and a controller 1e-40. However, the UE is not limited thereto and may include a smaller or larger number of elements compared to those illustrated in FIG. 1E.

The RF processor 1e-10 may perform functions for transmitting and receiving signals through wireless channels, e.g., band conversion and amplification of the signals. That is, the RF processor 1e-10 may up-convert a baseband signal provided from the baseband processor 1e-20, into an RF band signal and then transmit the RF band signal through an antenna, and down-convert an RF band signal received through the antenna, into a baseband signal. For example, the RF processor 1e-10 may include a transmit filter, a receive filter, an amplifier, a mixer, an oscillator, a digital-to-analog convertor (DAC), and an analog-to-digital convertor (ADC). However, the RF processor 1e-10 is not limited thereto. Although only one antenna is illustrated in FIG. 1E, the UE may include a plurality of antennas. The RF processor 1e-10 may include a plurality of RF chains. The RF processor 1e-10 may perform beamforming. For beamforming, the RF processor 1e-10 may adjust phases and intensities of signals to be transmitted or received through a plurality of antennas or antenna elements. The RF processor 1e-10 may perform multiple-input and multiple-output (MIMO) and receive data of a plurality of layers in the MIMO operation. The RF processor 1e-10 may perform received beam sweeping by appropriately configuring a plurality of antennas or antenna elements, or adjust a direction and a beam width of a received beam to coordinate with a transmit beam, under the control of the controller 1e-40.

The baseband processor 1e-20 may convert between a baseband signal and a bitstream based on physical layer specifications of a system. For example, for data transmission, the baseband processor 1e-20 generates complex symbols by encoding and modulating a transmit bitstream. For data reception, the baseband processor 1e-20 may reconstruct a received bitstream by demodulating and decoding a baseband signal provided from the RF processor 1e-10. For example, according to an orthogonal frequency division multiplexing (OFDM) scheme, for data transmission, the baseband processor 1e-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1e-20 may segment a baseband signal provided from the RF processor 1e-10, into OFDM symbol units, reconstruct signals mapped to subcarriers by performing fast Fourier transformation (FFT), and then reconstruct a received bitstream by demodulating and decoding the signals.

The baseband processor 1*e*-20 and the RF processor 1*e*-10 transmit and receive signals as described above. The baseband processor 1*e*-20 and the RF processor 1*e*-10 may also be called a transmitter, a receiver, a transceiver, or a communicator. At least one of the baseband processor 1*e*-20 or the RF processor 1*e*-10 may include a plurality of communication modules to support a plurality of different radio access technologies. At least one of the baseband processor 1*e*-20 or the RF processor 1*e*-10 may include different communication modules to process signals of different frequency bands. For example, the different radio access technologies may include a wireless LAN (e.g., IEEE 802.11) and a cellular network (e.g., an LTE network). The different frequency bands may include a super-high frequency (SHF) (e.g., 2. NRHz or NRhz) band and a millimeter wave (mmWave) (e.g., 60 GHz) band. The UE may transmit and receive signals to and from a base station by using the baseband processor 1*e*-20 and the RF processor 1*e*-10, and the signals may include control information and data.

The storage 1*e*-30 may store basic programs, application programs, and data, e.g., configuration information, for operations of the UE. In particular, the storage 1*e*-30 may store information about a second access node performing wireless communication by using a second radio access technology. The storage 1*e*-30 provides the stored data upon request by the controller 1*e*-40. The storage 1*e*-30 may include any or a combination of storage media such as read-only memory (ROM), random access memory (RAM), a hard disk, a compact disc (CD)-ROM, and a digital versatile disc (DVD). The storage 1*e*-30 may include a plurality of memories. According to an embodiment of the disclosure, the storage 1*e*-30 may store a program for executing a buffer status report (BSR) method of the disclosure.

The controller 1*e*-40 controls overall operations of the UE. For example, the controller 1*e*-40 transmits and receives signals through the baseband processor 1*e*-20 and the RF processor 1*e*-10. The controller 1*e*-40 records and reads data on or from the storage 1*e*-30. In this regard, the controller 1*e*-40 may include at least one processor. For example, the controller 1*e*-40 may include a communication processor (CP) for controlling communications and an application processor (AP) for controlling an upper layer such as an application program. According to an embodiment of the disclosure, the controller 1*e*-40 may include a multi-connection processor 1*e*-42 for performing processing to operate in a dual connectivity mode. At least one element in the UE may be configured in the form of a chip.

Figure 1F:
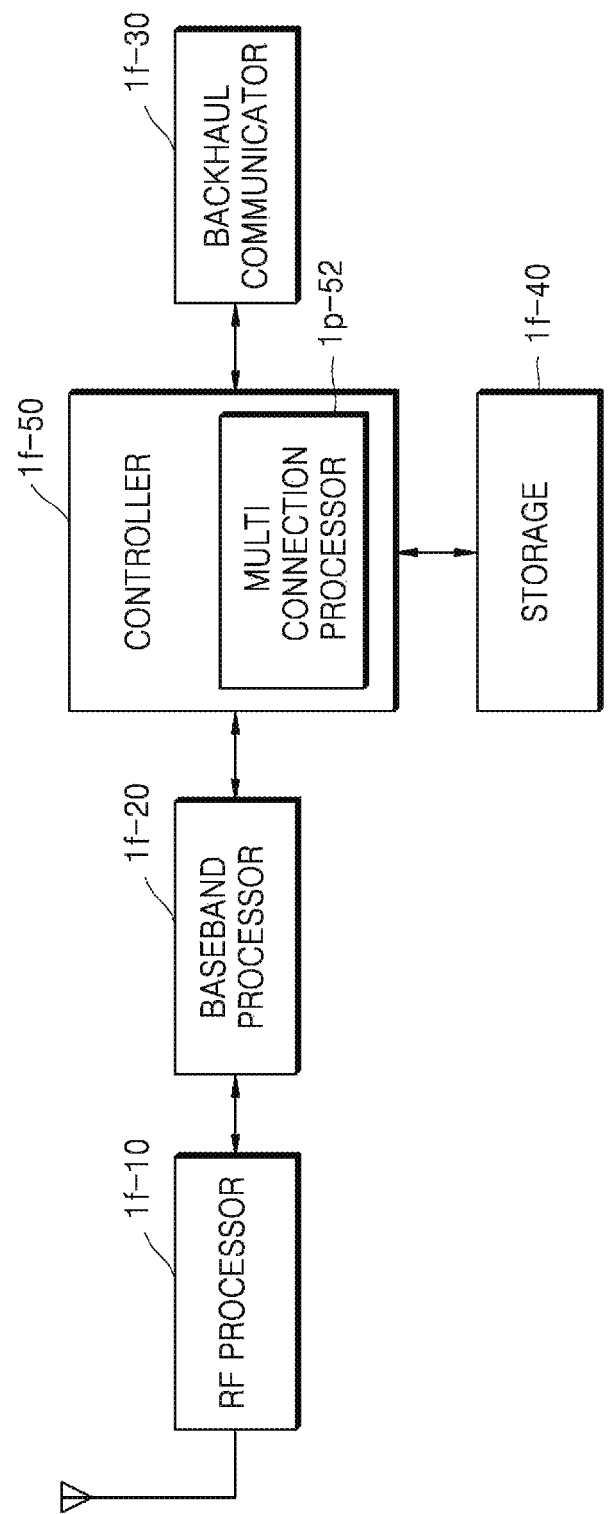
FIG. 1F is a block diagram of an NR gNode B (gNB) according to an embodiment of the disclosure.

FIG. 1F is a block diagram of an NR gNB according to an embodiment of the disclosure.

Referring to FIG. 1F, the NR gNB may include an RF processor 1*f*-10, a baseband processor 1*f*-20, a backhaul communicator 1*f*-30, a storage 1*f*-40, and a controller 1*f*-50. However, the NR gNB is not limited thereto and may include a smaller or larger number of elements compared to those illustrated in FIG. 1F.

The RF processor 1*f*-10 may perform functions for transmitting and receiving signals through wireless channels, e.g., band conversion and amplification of the signals. The RF processor 1*f*-10 may up-convert a baseband signal provided from the baseband processor 1*f*-20, into an RF band signal and then transmit the RF band signal through an antenna, and down-convert an RF band signal received through an antenna, into a baseband signal. For example, the RF processor 1*f*-10 may include a transmit filter, a receive filter, an amplifier, a mixer, an oscillator, a DAC, and an ADC. Although only one antenna is illustrated in FIG. 1F, the RF processor 1*f*-10 may include a plurality of antennas. The RF processor 1*f*-10 may include a plurality of RF chains. The RF processor 1*f*-10 may perform beamforming. For beamforming, the RF processor 1*f*-10 may adjust phases and intensities of signals to be transmitted or received through a plurality of antennas or antenna elements. The RF processor 1*f*-10 may perform DL MIMO by transmitting data of one or more layers.

The baseband processor 1*f*-20 may convert between a baseband signal and a bitstream based on physical layer specifications of a first radio access technology. For example, for data transmission, the baseband processor 1*f*-20 may generate complex symbols by encoding and modulating a transmit bitstream. For data reception, the baseband processor 1*f*-20 may reconstruct a received bitstream by demodulating and decoding a baseband signal provided from the RF processor 1*f*-10. For example, according to an OFDM scheme, for data transmission, the baseband processor 1*f*-20 may generate complex symbols by encoding and modulating a transmit bitstream, map the complex symbols to subcarriers, and then configure OFDM symbols by performing IFFT and CP insertion. For data reception, the baseband processor 1*f*-20 may segment a baseband signal provided from the RF processor 1*f*-10, into OFDM symbol units, reconstruct signals mapped to subcarriers by performing FFT, and then reconstruct a received bitstream by demodulating and decoding the signals. The baseband processor 1*f*-20 and the RF processor 1*f*-10 may transmit and receive signals as described above. As such, the baseband processor 1*f*-20 and the RF processor 1*f*-10 may also be called a transmitter, a receiver, a transceiver, a communicator, or a wireless communicator. The NR gNB may transmit and receive signals to and from a UE by using the baseband processor 1*f*-20 and the RF processor 1*f*-10, and the signals may include control information and data.

The backhaul communicator 1*f*-30 provides an interface for communicating with other nodes in a network. That is, the backhaul communicator 1*f*-30 converts a bitstream to be transmitted from a primary base station to another node, e.g., a secondary base station or a core network, into a physical signal, and converts a physical signal received from the other node, into a bitstream. The backhaul communicator 1*f*-30 may be included in a communicator.

The storage 1*f*-40 stores basic programs, application programs, and data, e.g., configuration information, for operations of the NR gNB. The storage 1*f*-40 may store, for example, information about bearers assigned for a connected UE and measurement results reported from the connected UE. The storage 1*f*-40 may store criteria information used to determine whether to provide or release dual connectivity to or from the UE. The storage 1*f*-40 provides the stored data upon request by the controller 1*f*-50. The storage 1*f*-40 may include any or a combination of storage media such as ROM, RAM, a hard disk, a CD-ROM, and a DVD. The storage 1*f*-40 may include a plurality of memories. According to an embodiment of the disclosure, the storage 1*f*-40 may store a program for executing a BSR method of the disclosure.

The controller 1*f*-50 controls overall operations of the NR gNB. For example, the controller 1*f*-50 transmits and receives signals through the baseband processor 1*f*-20 and the RF processor 1*f*-10, or the backhaul communicator 1*f*-30. The controller 1*f*-50 records and reads data on or from the storage 1*f*-40. In this regard, the controller 1*f*-50 may include at least one processor. For example, the controller 1*f*-50 may include a multi-connection processor 1*p*-52 for controlling communications. At least one element of the NR gNB may be configured in the form of a chip.

As used herein, DL/UL BSR refers to downlink or uplink buffer status report and is expressed in a comprehensive manner to merely avoid repeated descriptions of DL BSR and UL BSR which have no operational correlations therebetween in all related operations.

When a UE has a mobile terminal (MT) function of an integrated access and backhaul (IAB) node and perceives that it has the MT function, the UE may establish a connection to a base station capable of supporting the MT function of the IAB node. The UE may access an IAB node, which broadcasts capability of the IAB node capable of supporting the MT function, as a base station, or access an IAB node, which does not broadcast capability of the IAB node, as a base station and then transmit information about an interest or function of the UE related to an IAB MT to enquire about whether the base station supports an IAB operation. A DL BSR or UL BSR operation may be performed only after the UE and the base station perceive each other as having an MT function of an IAB node and a distributed unit (DU) function of an IAB base station or an IAB node through the above-described procedure.

Figure 1G:
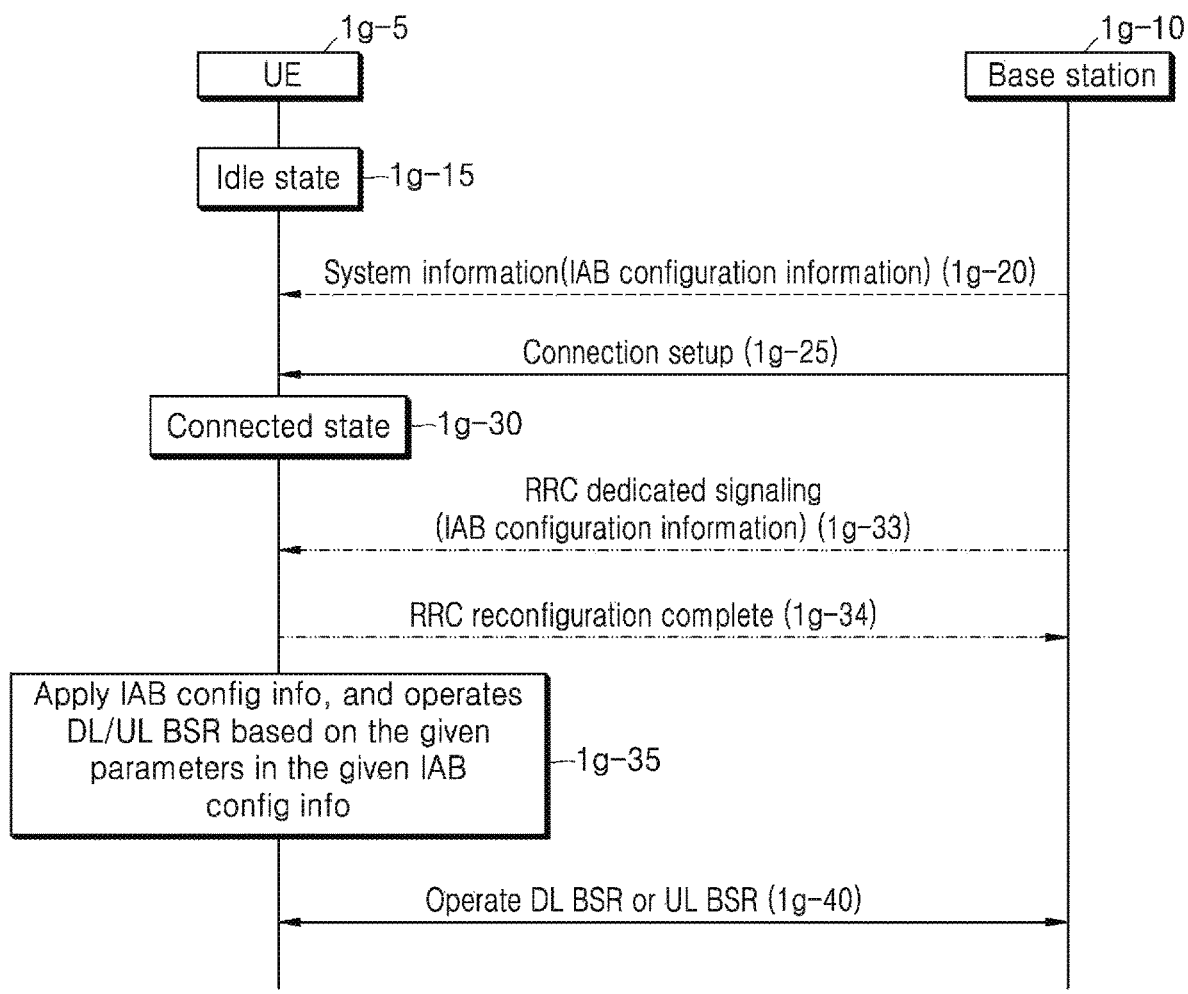
FIG. 1G is a flowchart showing a case in which integrated access and backhaul (IAB) mobile terminal (MT) configuration information transmitted from a base station is received as a downlink (DL) or uplink (UL) buffer status report (BSR) triggering condition, according to an embodiment of the disclosure.

FIG. 1G is a flowchart showing a case in which IAB MT configuration information transmitted from a base station 1g-10 is received as a DL or UL BSR triggering condition, according to an embodiment of the disclosure.

A UE 1g-5 receives system information (1g-20) in an idle state (1g-15) before accessing the base station 1g-10. This system information may include IAB configuration information. When the UE 1g-5 having received the system information is switched to a connected state (1g-30) through a connection setup procedure (1g-25), the given IAB configuration information is applied (1g-35) and DL/UL BSR is performed accordingly (1g-40). In this procedure, instead of receiving the system information (1g-20), after being switched to the connected state (1g-30), the IAB configuration information may be transmitted through RRC dedicated signaling (1g-33). When the IAB configuration information is transmitted through RRC dedicated signaling, an RRC reconfiguration complete message may be additionally transmitted to the base station 1g-10 (1g-34) and then operations 1g-35 and 1g-40 may be performed.

The DL/UL BSR operation 1g-40 may differ in details depending on whether DL/UL BSR is dynamically requested by the base station 1g-10 or a specific condition for DL/UL BSR is given to the UE 1g-5. The DL/UL BSR operation 1g-40 will be described in detail below with reference to FIGS. 1J and 1K.

The information transmitted in operation 1g-20 or 1g-33 may include IAB node configuration information. The IAB node configuration information may include at least one of an indicator indicating whether DL BSR for IAB is supported, an indicator indicating whether UL BSR for IAB is supported, a buffer size threshold value used to determine whether to perform DL or UL BSR, or time information for DL or UL BSR. The IAB node configuration information may also include an indicator indicating whether a buffer size index to be used for DL or UL BSR, and buffer size range information corresponding thereto are based on an IAB table or a general BSR table, but is not limited thereto.

Figure 1H:
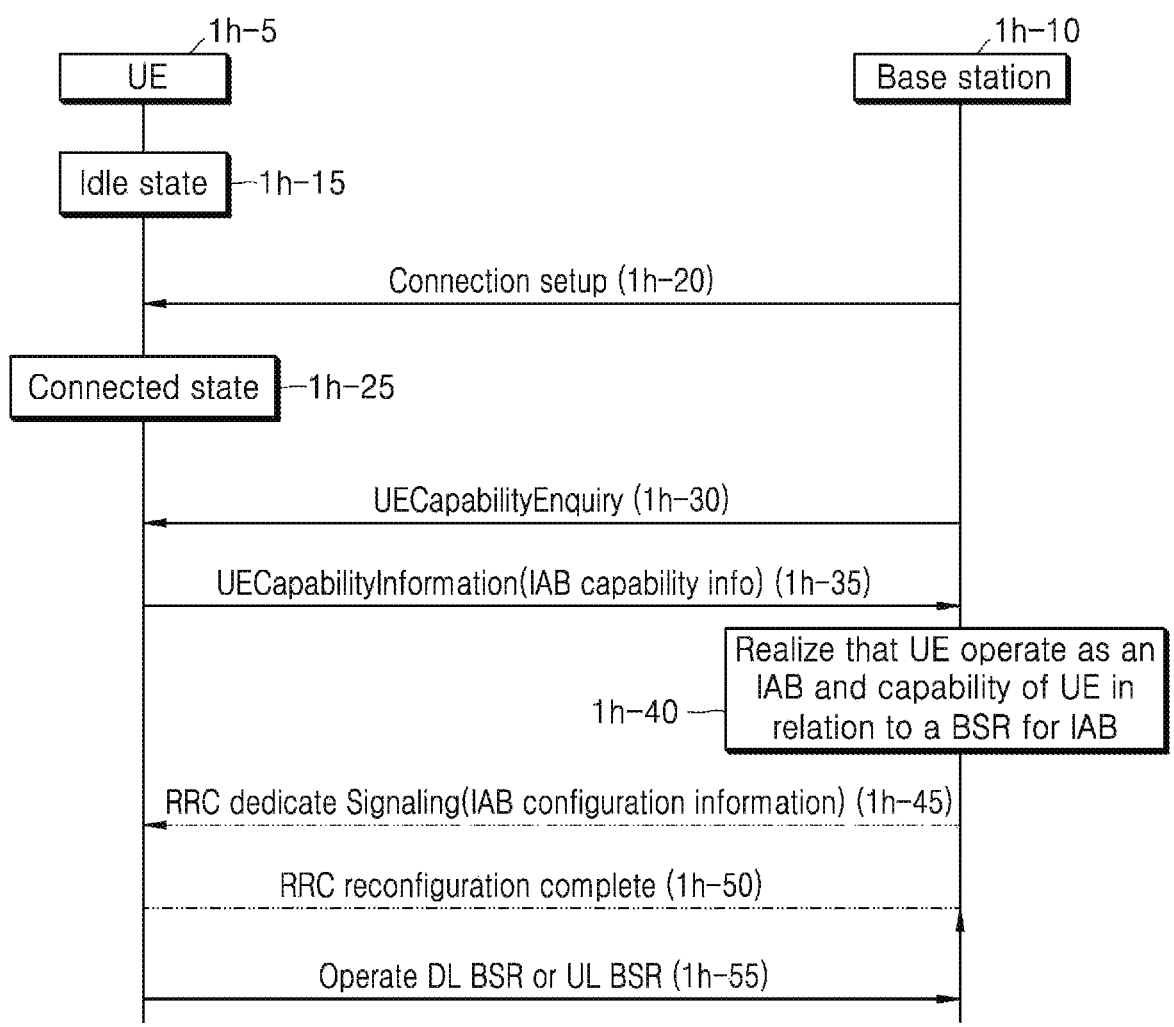
FIG. 1H is a flowchart showing a case in which a UE transmits IAB capability information as a DL or UL BSR triggering condition, according to an embodiment of the disclosure.

FIG. 1H is a flowchart showing a case in which a UE 1h-5 transmits IAB capability information as a DL or UL BSR triggering condition, according to an embodiment of the disclosure.

When the UE 1h-5 is switched from an idle state (1h-15) before accessing a base station 1h-10, to a connected state (1h-25) through a connection setup procedure (1h-20), the base station 1h-10 may transmit a message for enquiring about capability information of the UE 1h-5 (1h-30). The UE 1h-5 having received the message may include IAB capability information of the UE 1h-5 in a separate message and transmit the message to the base station 1h-10 (1h-35). Based on the received message carrying the capability information of the UE 1h-5, the base station 1h-10 may realize that the UE 1h-5 operates as an IAB MT, and realize capability of the UE 1h-5 in relation to a BSR operation for IAB (1h-40). Based on the obtained capability information of the UE 1h-5, the base station 1h-10 may transmit IAB configuration information through RRC dedicated signaling (1h-45). The UE 1h-5 having received the IAB configuration information is configured based on the received information and transmits an RRC reconfiguration complete message to the base station 1h-10 (1h-50). Thereafter, the UE 1h-5 performs a DL/UL BSR operation (1h-55). The DL/UL BSR operation 1h-55 will be described in detail below with reference to FIGS. 1J and 1K.

The information transmitted in operation 1h-35 is IAB capability information of the UE 1h-5, and the IAB capability information of the UE 1h-5 may include, for example, information indicating whether DL/UL BSR is supported, and information about a table showing correlations between a buffer size index and a buffer size range when DL/UL BSR is supported. The IAB capability information of the UE 1h-5 may also include band combination information usable by an IAB MT.

The information transmitted in operation 1h-45 may include IAB node configuration information. The IAB node configuration information may include at least one of an indicator indicating whether DL BSR for IAB is supported, an indicator indicating whether UL BSR for IAB is supported, a buffer size threshold value used to determine whether to perform DL or UL BSR, or time information for DL or UL BSR. The IAB node configuration information may also include an indicator indicating whether a buffer size index to be used for DL or UL BSR, and buffer size range information corresponding thereto are based on an IAB table or a general BSR table. However, the IAB node configuration information is not limited thereto.

Figure 1I:
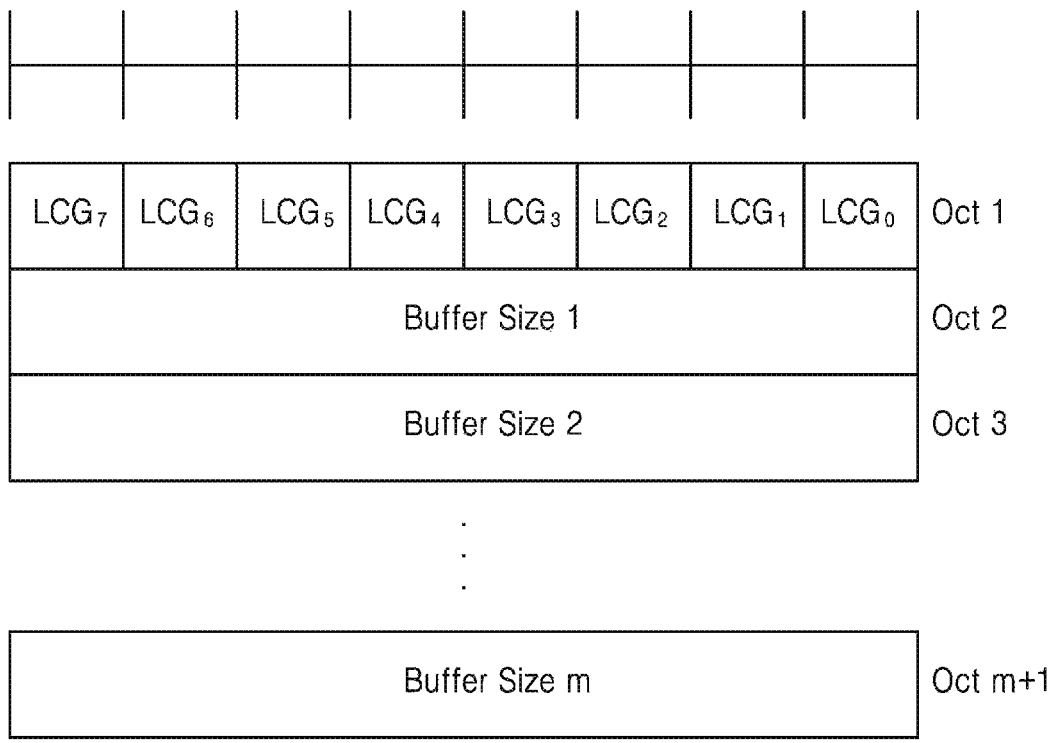
FIG. 1I is a schematic diagram illustrating a type of a DL or UL BSR format according to an embodiment of the disclosure.

FIG. 1I is a schematic diagram illustrating a type of a DL/UL BSR format according to an embodiment of the disclosure.

A DL/UL BSR may be signaled as a MAC control element (CE). The DL/UL BSR may be indicated by a logical channel ID included in a MAC subheader for an uplink shared channel (UL-SCH), and be identified from other MAC CEs carried on the UL-SCH. According to an embodiment of the disclosure, a detailed DL/UL BSR format may follow a long BSR format of LTE. Specifically, the DL/UL BSR format may include LCG_i fields and buffer size fields. Each LCG_i field indicates whether a buffer size field for a logical channel group i is present. When the LCG_i field is set to be 1, it indicates that the buffer size field for the logical channel group i is reported. When the LCG_i field is set to be 0, it indicates that the buffer size field for the logical channel group i is not reported.

A logical channel group ID (LCG ID) refers to a predefined group of logical channels of a UE. Herein, i of the LCG_i field may refer to each logical channel group ID and be defined as an integer from 0 to (a multiple of 8)−1. The LCG_i fields may be assigned in octets. That is, bits to which the LCG_i fields are assigned may include the entirety of octet 1, the entirety of octets 1 and 2, or the entirety of octets 1, 2, and 3.

According to an embodiment of the disclosure, information carried by each buffer size field may be different for DL BSR and UL BSR. For DL BSR, the information carried by the buffer size field indicates a total amount of transmittable or valid (or currently existing) DL data. For DL BSR, the information carried by the buffer size field may be calculated for all logical channels belonging to a logical channel group, by using a data volume calculation scheme according to TS 38.322 and TS 38.323, when DL BSR is triggered. For UL BSR, the information carried by the buffer size field indicates a total amount of transmittable or valid (or currently existing) UL data. For UL BSR, the information carried by the buffer size field is calculated for all logical channels belonging to a logical channel group, by using a data volume calculation scheme according to TS 38.322 and TS 38.323, when UL BSR is triggered. The amount of data of the buffer size field may be indicated in bytes. When a buffer size is calculated, an adaptation layer, an RLC layer, and a MAC header may not be considered. The buffer size field may have a length of 8 bits. The buffer size fields may be included in ascending order based on LCG_i. (Buffer Size fields are included in ascending order based on the LCGi.)

The buffer size fields are located after an octet to which the LCG_i fields are assigned in a bitstream of a DL/UL BSR MAC CE. A value of the buffer size field may be an index value indicating a total amount of data, and each index may represent a range of the buffer size value. The value of the 8-bit buffer size field and the range thereof may be shown in the following table. However, the value and the range are not limited thereto.

TABLE 1

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |
| 29 | ≤62 |
| 30 | ≤66 |
| 31 | ≤71 |
| 32 | ≤75 |
| 33 | ≤80 |
| 34 | ≤85 |
| 35 | ≤91 |
| 36 | ≤97 |
| 37 | ≤103 |
| 38 | ≤110 |

TABLE 1-continued

| Index | BS value |
|---|---|
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |
| 111 | ≤10760 |
| 112 | ≤11458 |
| 113 | ≤12202 |
| 114 | ≤12994 |
| 115 | ≤13838 |
| 116 | ≤14736 |

TABLE 1-continued

| Index | BS value |
|---|---|
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

According to an embodiment of the disclosure, the maximum buffer size value of the 8-bit buffer size field and the range of the buffer size value indicated by each index may be greater than those of the above table.

According to an embodiment of the disclosure, mapping between a DL data radio bearer (DRB) group and a logical channel group (or a backhaul radio link control (RLC) channel group) for DL BSR may be the same as that for UL BSR, or may be determined differently by a central unit (CU).

Figure 1J:
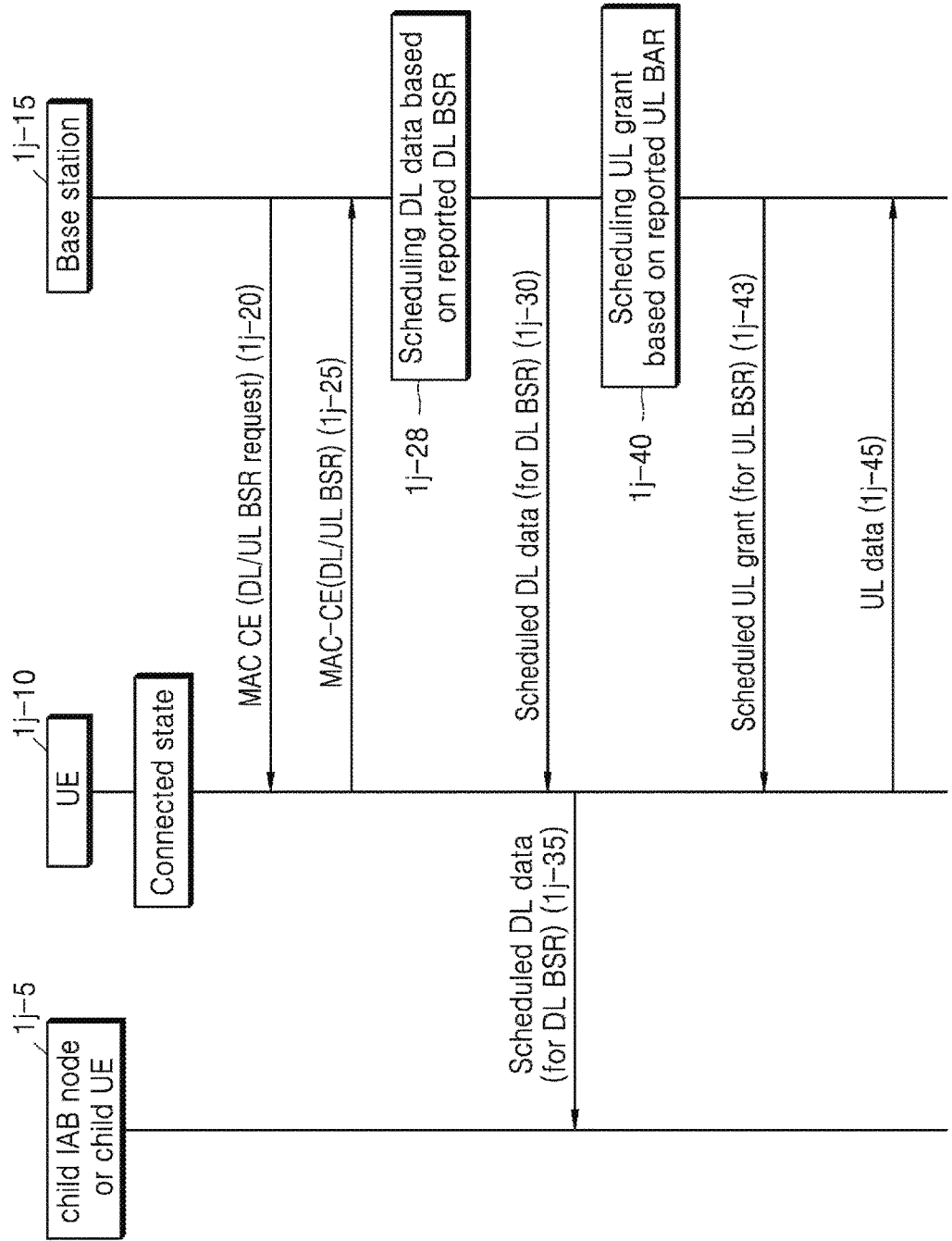
FIG. 1J is a flowchart of a procedure in which a base station directly triggers DL/UL BSR from a UE by using a DL/UL BSR request media access control (MAC) control element (CE), according to an embodiment of the disclosure.
Figure 1K:
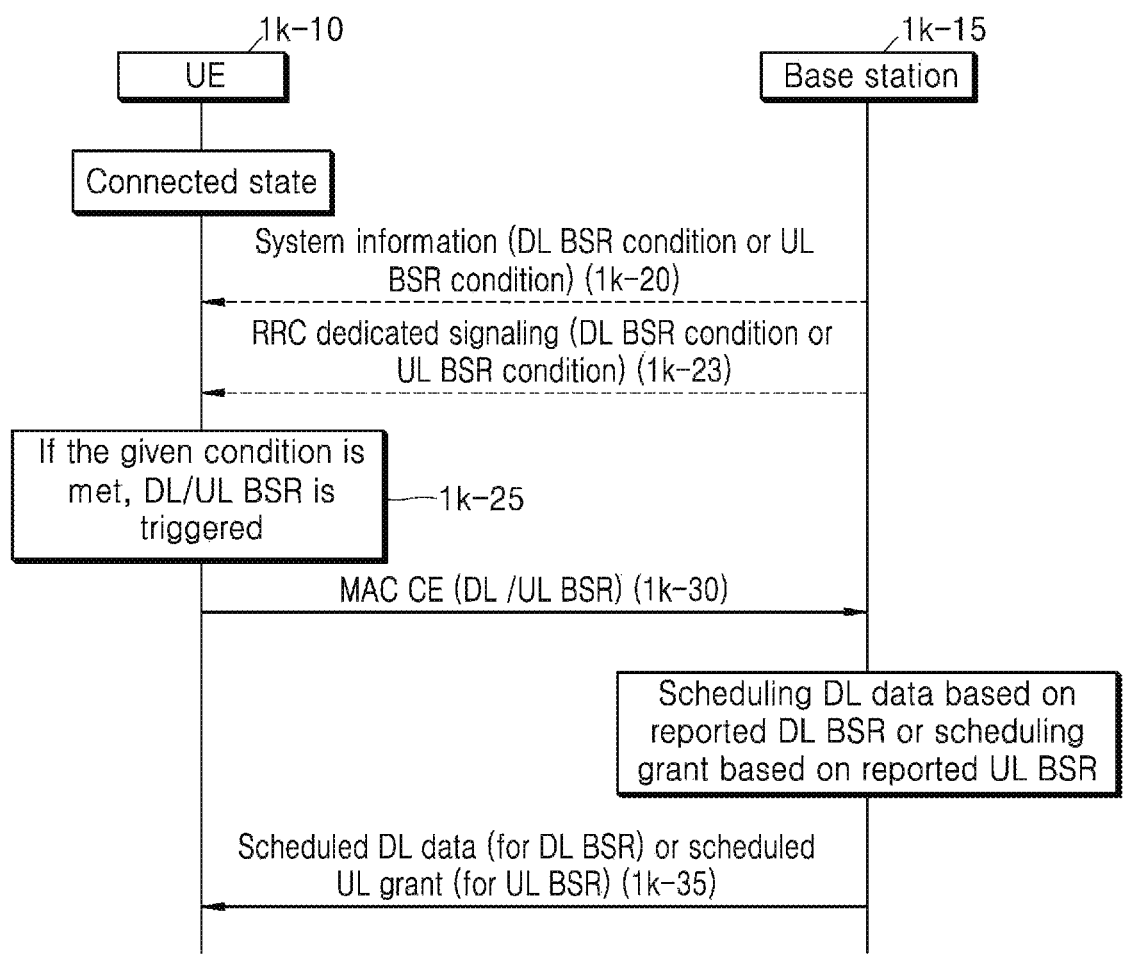
FIG. 1K is a flowchart of a procedure in which a base station triggers DL/UL BSR by transmitting a condition without using a DL/UL BSR request MAC CE, according to an embodiment of the disclosure.

Referring to FIGS. 1J and 1K, a case in which a UE transmits a DL/UL BSR when a base station directly requests DL/UL BSR or when a DL/UL BSR triggering condition transmitted using system information or a dedicated signal is met is considered. When the base station directly requests DL/UL BSR, a DL/UL BSR request MAC CE may be considered. The MAC CE is carried on a downlink shared channel (DL-SCH) channel transmitted by the base station. That is, a DL/UL BSR request may be signaled using a MAC CE identified by a logical channel ID (LCID) in a MAC subheader for a DL-SCH. When the base station transmits the DL/UL BSR request MAC CE through a DL-SCH, the UE transmits the DL/UL BSR MAC CE to a serving base station.

FIG. 1J is a flowchart of a procedure in which a base station $1j$-15 directly triggers DL/UL BSR from a UE $1j$-10, by using a DL/UL BSR request MAC CE, according to an embodiment of the disclosure.

The UE $1j$-10 is in a connected state to the base station $1j$-15. The base station $1j$-15 transmits a MAC CE to the UE $1j$-10 through a DL-SCH for a specific reason, and the MAC CE transmitted to the UE $1j$-10 includes a DL/UL BSR request commanding DL/UL BSR transmission. The UE $1j$-10 receives the MAC CE ($1j$-20), calculates a buffer size currently required for each logical channel group (LCG), and transmits a DL/UL BSR in a MAC CE through a UL-SCH ($1j$-25). For the DL BSR, the base station $1j$-15 having received this information schedules required DL data ($1j$-28) and transmits the same to the UE $1j$-10 ($1j$-30). The UE $1j$-10 transmits the received DL data to a child IAB node or UE $1j$-5 served by the UE $1j$-10, through autonomous scheduling ($1j$-35). For the UL BSR, the base station $1j$-15 having received this information schedules required UL grant ($1j$-40) and transmits the same to the UE $1j$-10 ($1j$-43). The UE $1j$-10 transmits UL data to the base station $1j$-15 by using the received UL grant ($1j$-45). The DL BSR and the UL BSR are independent operations and thus occur independently of each other.

FIG. 1K is a flowchart of a procedure in which a base station triggers DL/UL BSR by transmitting a condition without using a DL/UL BSR request MAC CE, according to an embodiment of the disclosure.

Referring to FIG. 1K, a base station $1k$-15 may transmit a DL/UL BSR triggering condition of a UE $1k$-10 by transmitting system information or a dedicated signal without a DL/UL BSR request MAC CE of the base station $1k$-15. According to an embodiment of the disclosure, the UE $1k$-10 may receive the DL/UL BSR triggering condition from the serving base station $1k$-15 by using system information $1k$-20 or an RRC dedicated signal $1k$-23. The DL/UL BSR triggering condition may include at least one of a specific LCG ID (or logical channel ID, DL DRB ID, or DL DRB group (DRBG) ID) or a threshold value of a buffer size applied to a LCG (or logical channel, DL DRB, or DL DRBG) of the ID. When information about the DL/UL BSR triggering condition is received and when a buffer size of the LCG (or logical channel, DL DRB, or DL DRBG) is equal to or greater than the given threshold value ($1k$-25), the UE $1k$-10 transmits a DL/UL BSR ($1k$-30). According to an embodiment of the disclosure, the base station $1k$-15 may transmit only the threshold value to the UE $1k$-10 as the DL/UL BSR triggering condition. When a buffer size of a certain LCG (or logical channel, DL DRB, or DL DRBG) of the UE $1k$-10 exceeds the threshold value ($1k$-25), the UE $1k$-10 may also transmit a DL/UL BSR to the base station $1k$-15 ($1k$-30).

According to an embodiment of the disclosure, the base station $1k$-15 may transmit a specific time cycle value by using the system information $1k$-20 or the RRC dedicated signal $1k$-23. When the specific time cycle value is received, the UE $1k$-10 may transmit a DL/UL BSR to the base station $1k$-15 based on the time cycle.

When the condition transmitted from the base station $1k$-15 is met and when the UE $1k$-10 transmits a DL BSR to the base station $1k$-15, the base station $1k$-15 schedules DL data based on the received DL BSR and transmits the same to the UE $1k$-10 ($1k$-35). When the UE $1k$-10 transmits a UL BSR to the base station $1k$-15, the base station $1k$-15 schedules UL grant based on the received UL BSR and transmits the same to the UE $1k$-10 ($1k$-35).

Figure 1L:
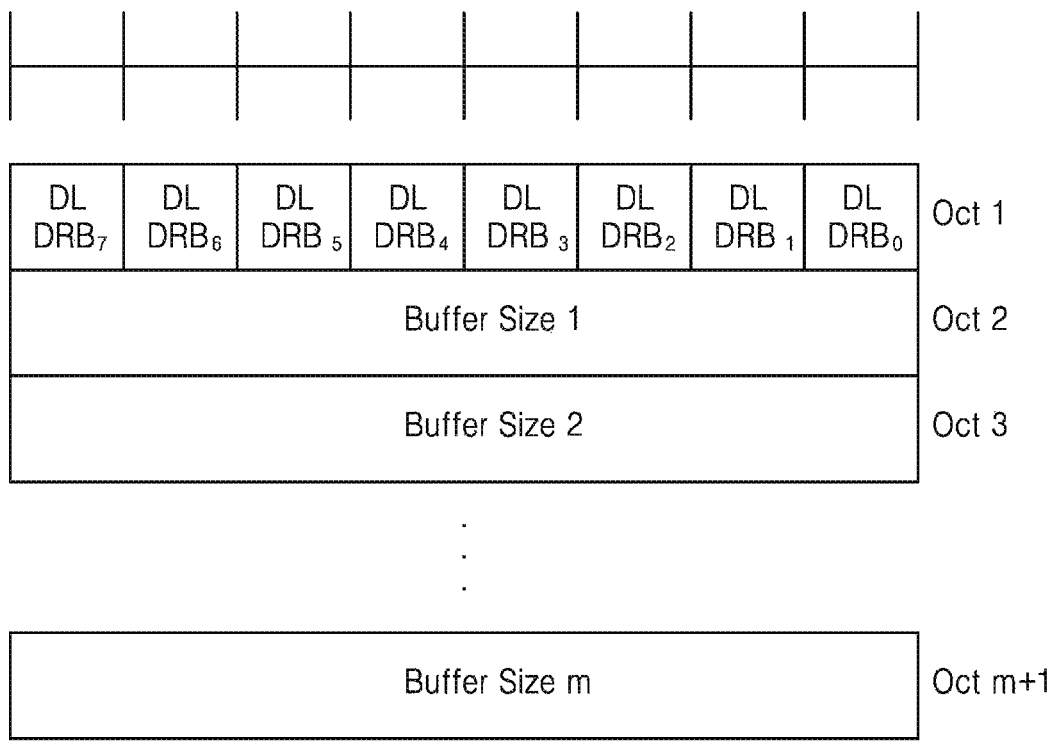
FIG. 1L is a schematic diagram illustrating an example of a DL/UL BSR format in which a buffer size is transmitted per DL data radio bearer (DRB), according to an embodiment of the disclosure.

FIG. 1L is a schematic diagram illustrating an example of a DL/UL BSR format in which a buffer size is transmitted per DL DRB, according to an embodiment of the disclosure.

As information carried by a DL/UL BSR, a buffer size may be transmitted per DL DRB. Information about the buffer size may be transmitted on a UL-SCH by using a MAC CE. A DL BSR field may include DL DRB_i fields and buffer size fields. Each DL DRB_i field indicates whether a buffer size field for a DL DRB of an ID i is present. When the DL DRB_i field is set to be 1, it indicates that the buffer size field for the DL DRB i is reported. When the DL DRB_i field is set to be 0, it indicates that the buffer size field for the DL DRB i is not reported. Information carried by each buffer size field indicates a total amount of transmittable or valid DL data. The information carried by the buffer size field indicates a total amount of data for a DL DRBG in bytes, when DL BSR is triggered. When a buffer size is calculated, an adaptation layer, an RLC layer, and a MAC header may not be considered. The buffer size field may have a length of 8 bits. The buffer size fields may be included in ascending order based on DRB_i. The buffer size fields may be located after an octet to which the DL DRB_i fields are assigned in a bitstream of a DL BSR MAC CE. A value of the buffer size field may be an index value indicating a total amount of data, and each index may represent a range of the buffer size value. The value of the 8-bit buffer size field and the range thereof may be shown in the following table.

TABLE 2

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |

TABLE 2-continued

| Index | BS value |
|---|---|
| 29 | ≤62 |
| 30 | ≤66 |
| 31 | ≤71 |
| 32 | ≤75 |
| 33 | ≤80 |
| 34 | ≤85 |
| 35 | ≤91 |
| 36 | ≤97 |
| 37 | ≤103 |
| 38 | ≤110 |
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |
| 111 | ≤10760 |
| 112 | ≤11458 |
| 113 | ≤12202 |
| 114 | ≤12994 |
| 115 | ≤13838 |
| 116 | ≤14736 |
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |

TABLE 2-continued

| Index | BS value |
|---|---|
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

Figure 1M:
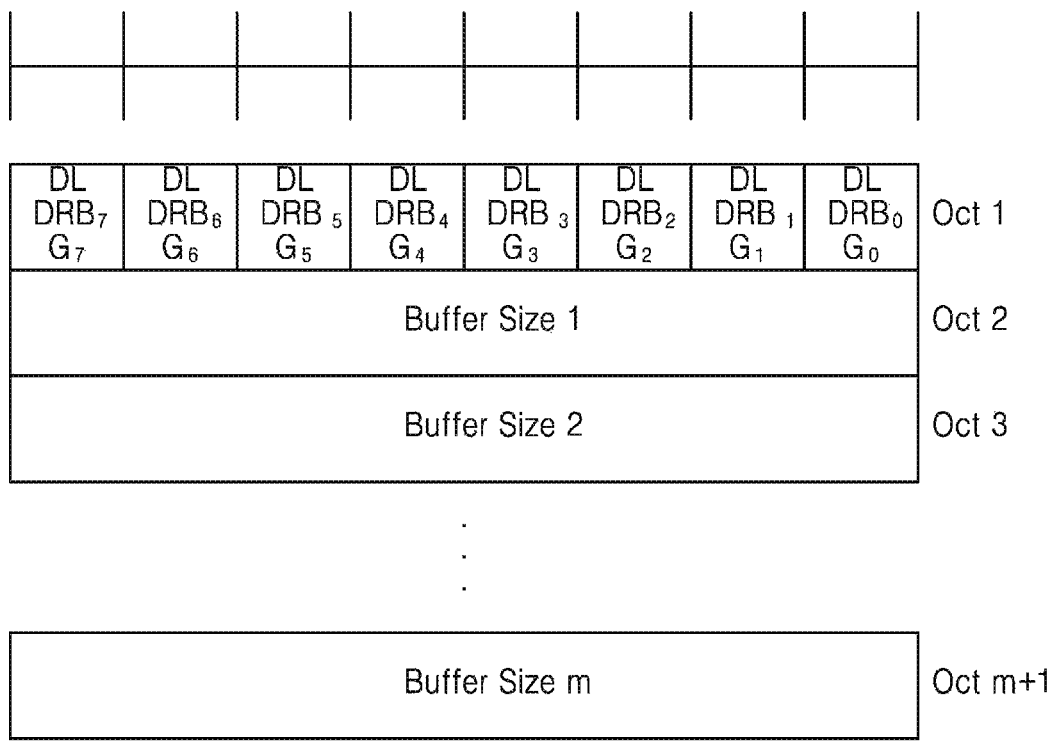
FIG. 1M is a schematic diagram illustrating an example of a DL/UL BSR format in which a buffer size is transmitted per DL data radio bearer group (DRBG), according to an embodiment of the disclosure.

FIG. 1M is a schematic diagram illustrating an example of a DL/UL BSR format in which a buffer size is transmitted per DL DRBG, according to an embodiment of the disclosure. As information carried by a DL/UL BSR, a buffer size may be transmitted per DL DRBG. DRBG is a group of pre-defined DRBs. Information about the buffer size may be transmitted on a UL-SCH by using a MAC CE. A DL BSR field may include DL DRBG_i fields and buffer size fields. Each DL DRBG_i field indicates whether a buffer size field for a DL DRBG of an ID i is present. When the DL DRBG_i field is set to be 1, it indicates that the buffer size field for the DL DRBG i is reported. When the DL DRBG_i field is set to be 0, it indicates that the buffer size field for the DL DRBG i is not reported. Information carried by each buffer size field indicates a total amount of transmittable or valid DL data. The information carried by the buffer size field indicates a total amount of data for a DL DRBG in bytes, when DL BSR is triggered. When a buffer size is calculated, an adaptation layer, an RLC layer, and a MAC header may not be considered. The buffer size field may have a length of 8 bits. The buffer size fields may be included in ascending order based on DRBG_i. The buffer size fields may be located after an octet to which the DL DRBG_i fields are assigned in a bitstream of a DL BSR MAC CE. A value of the buffer size field may be an index value indicating a total amount of data, and each index may represent a range of the buffer size value. The value of the 8-bit buffer size field and the range thereof may be shown in the following table.

TABLE 3

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |
| 29 | ≤62 |
| 30 | ≤66 |
| 31 | ≤71 |
| 32 | ≤75 |
| 33 | ≤80 |
| 34 | ≤85 |
| 35 | ≤91 |
| 36 | ≤97 |
| 37 | ≤103 |
| 38 | ≤110 |
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |

TABLE 3-continued

| Index | BS value |
|---|---|
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |
| 111 | ≤10760 |
| 112 | ≤11458 |
| 113 | ≤12202 |
| 114 | ≤12994 |
| 115 | ≤13838 |
| 116 | ≤14736 |
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |

TABLE 3-continued

| Index | BS value |
|---|---|
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

According to an embodiment of the disclosure, the maximum buffer size value of the 8-bit buffer size field and the range of the buffer size value indicated by each index may be greater than those of the above table.

Figure 2A:
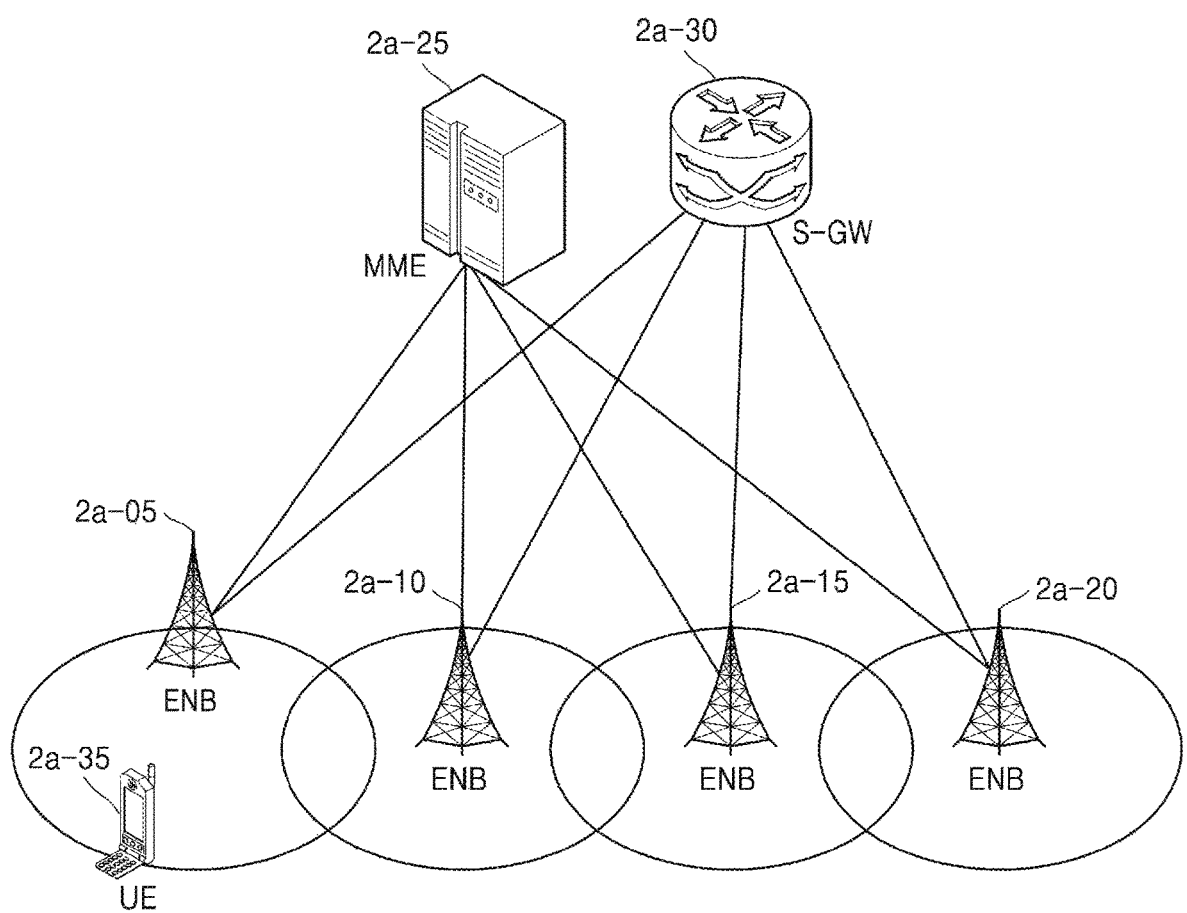
FIG. 2A is a schematic diagram of an LTE system according to an embodiment of the disclosure.

FIG. 2A is a schematic diagram of an LTE system according to an embodiment of the disclosure.

Referring to FIG. 2A, the wireless communication system includes a plurality of ENBs 2a-05, 2a-10, 2a-15, and 2a-20, an MME 2a-25, and a S-GW 2a-30. A UE 2a-35 may access an external network via the ENB 2a-05, 2a-10, 2a-15, or 2a-20 and the S-GW 2a-30.

The ENBs 2a-05, 2a-10, 2a-15, and 2a-20 are access nodes of a cellular network and provide radio accesses to UEs accessing the network. That is, for user traffic services, the ENBs 2a-05, 2a-10, 2a-15, and 2a-20 may support connections between the UEs and a core network (CN) by collating status information, e.g., buffer status information, available transmit power status information, and channel status information, of the UEs and performing scheduling. The MME 2a-25 is an entity for performing a mobility management function and various control functions on the UE 2a-35 and is connected to the plurality of ENBs 2a-05, 2a-10, 2a-15, and 2a-20, and the S-GW 2a-30 is an entity for providing data bearers. The MME 2a-25 and the S-GW 2a-30 may perform authentication, bearer management, etc. on the UE 2a-35 accessing the network, and process packets received from or to be transmitted to the ENBs 2a-05, 2a-10, 2a-15, and 2a-20.

Figure 2B:
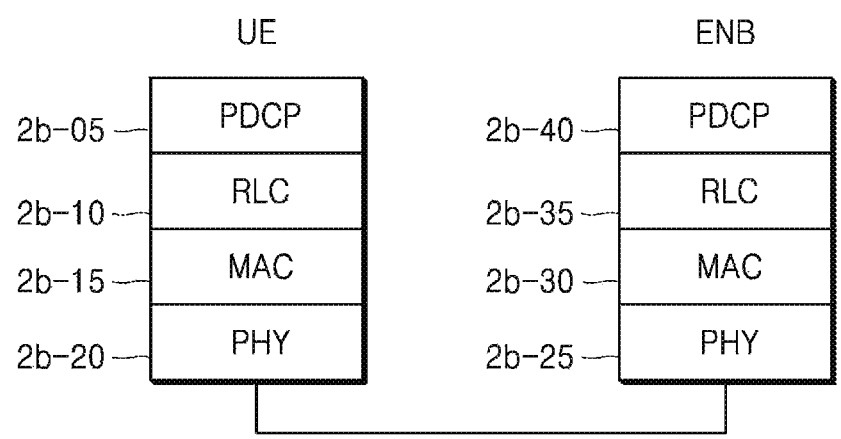
FIG. 2B is a diagram illustrating a radio protocol architecture of an LTE system according to an embodiment of the disclosure.

FIG. 2B is a diagram illustrating a radio protocol architecture of an LTE system according to an embodiment of the disclosure.

Referring to FIG. 2B, the radio protocol architecture of the LTE system may include PDCP layers 2b-05 and 2b-40, RLC layers 2b-10 and 2b-35, and MAC layers 2b-15 and 2b-30 respectively for a UE and an ENB. The PDCP layer 2b-05 or 2b-40 may be in charge of, for example, IP header compression/decompression, and the RLC layer 2b-10 or 2b-35 may reconfigure PDCP PDUs to appropriate sizes. The MAC layer 2b-15 or 2b-30 may be connected to a plurality of RLC layers configured for one UE and multiplex RLC PDUs into a MAC PDU and demultiplex the RLC PDUs from the MAC PDU. A PHY layer 2b-20 or 2b-25 may channel-code and modulate upper layer data into OFDM symbols and transmit the OFDM symbols through a wireless channel, or demodulate OFDM symbols received through a wireless channel and channel-decode and deliver the OFDM symbols to an upper layer. The PHY layer 2b-20 or 2b-25 may also use HARQ for additional error correction, and a receiver may transmit 1-bit information indicating whether a packet transmitted from a transmitter is received. Such information is called HARQ acknowledgement (ACK)/negative acknowledgement (NACK) information. DL HARQ ACK/NACK information for UL transmission may be transmitted through a physical HARQ indicator channel (PHICH), and UL HARQ ACK/NACK information for DL transmission may be transmitted through a physical uplink control channel (PUCCH) or a physical uplink shared channel (PUSCH). Although the PUCCH may be generally transmitted in a UL of a primary cell (PCell) to be described below, when supported by the UE, a secondary cell (SCell) may additionally transmit the PUCCH to the UE, which is called a PUCCH SCell.

Although not shown in FIG. 2B, RRC layers may be present above the PDCP layers 2b-05 and 2b-40 of the UE and the ENB, and exchange access and measurement configuration control messages to control radio resources.

The PHY layer 2b-20 or 2b-25 may include one or more frequencies/carriers, and a technology for simultaneously configuring and using a plurality of frequencies is called carrier aggregation (CA). The CA technology may increase one carrier used for communication between a UE and an E-UTRAN nodeB (eNB), into one main carrier and one or more subcarriers, thereby greatly increasing a data rate by the number of subcarriers. In LTE, among cells covered by an eNB, a cell using a main carrier is called a primary cell (PCell), and a cell using a subcarrier is called a secondary cell (SCell).

Figure 2C:
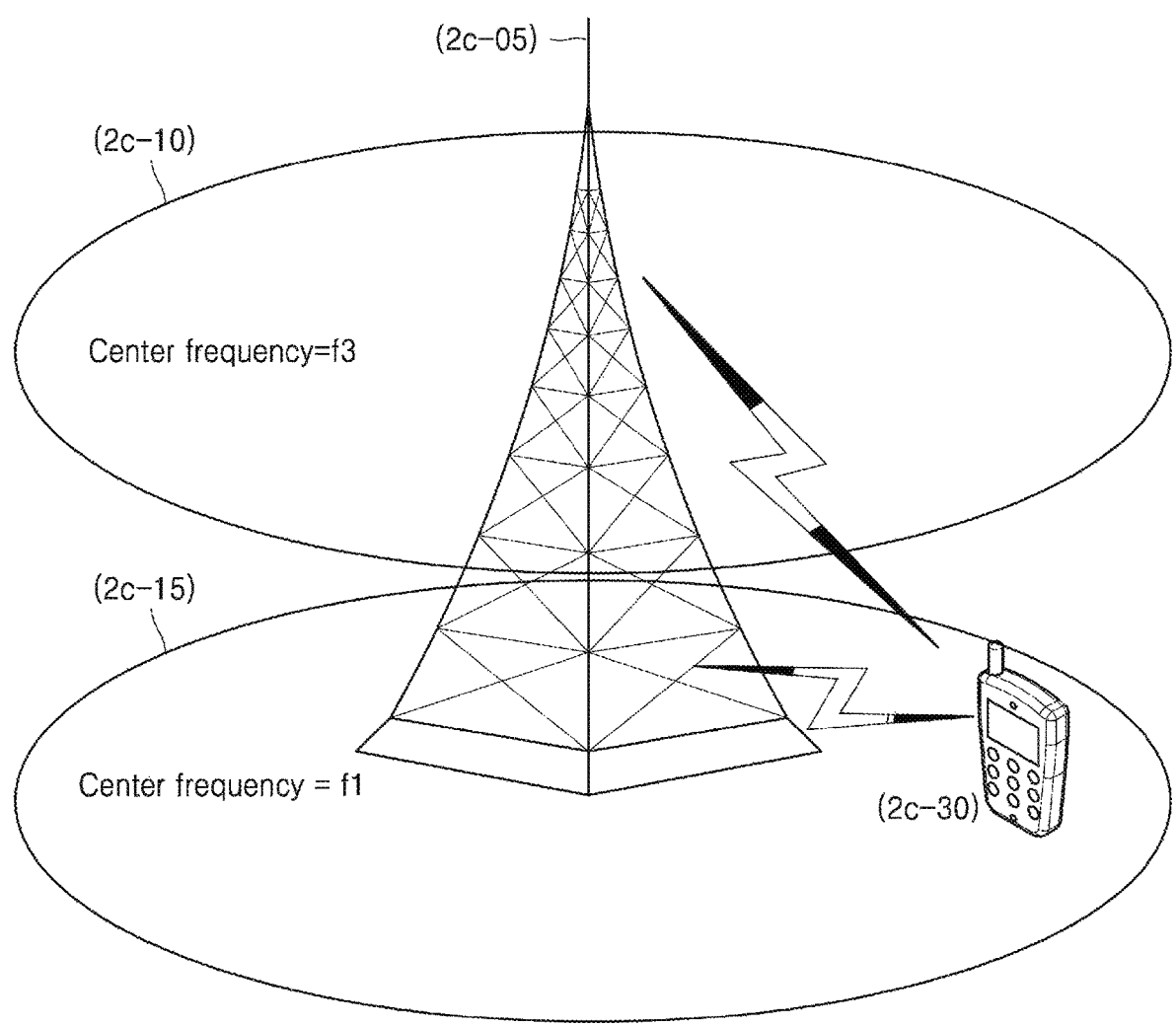
FIG. 2C is a diagram for describing a carrier aggregation (CA) technology at a UE, according to an embodiment of the disclosure.

FIG. 2C is a diagram for describing a CA technology at a UE 2c-30, according to an embodiment of the disclosure.

Referring to FIG. 2C, one base station may generally transmit and receive multiple carriers over a plurality of frequency bands. For example, when a base station 2c-05 transmits a carrier 2c-15 having a center frequency of f1 and a carrier 2c-10 having a center frequency of f3, a general UE transmits and receives data by using one of the two carriers 2c-15 and 2c-10. However, the UE 2c-30 having CA capability may transmit and receive data by simultaneously using a plurality of carriers. The base station 2c-05 may increase a data rate of the UE 2c-30 having CA capability, by assigning more carriers to the UE 2c-30 in some cases.

Typically, assuming that one forward carrier and one backward carrier transmitted and received by one base station configure one cell, CA may also be understood as data transmission and reception of a UE simultaneously through a plurality of cells. As such, a peak data rate increases in proportion to the number of aggregated carriers.

In the following description, data reception or transmission of a UE through an arbitrary forward or backward carrier may have the same meaning as data transmission or reception using a control or data channel provided by a cell corresponding to a center frequency and a frequency band characterizing a carrier. Although the following description will be provided on the assumption of an LTE system for convenience of explanation, the disclosure may be applied to various wireless communication systems supporting CA.

Figure 2D:
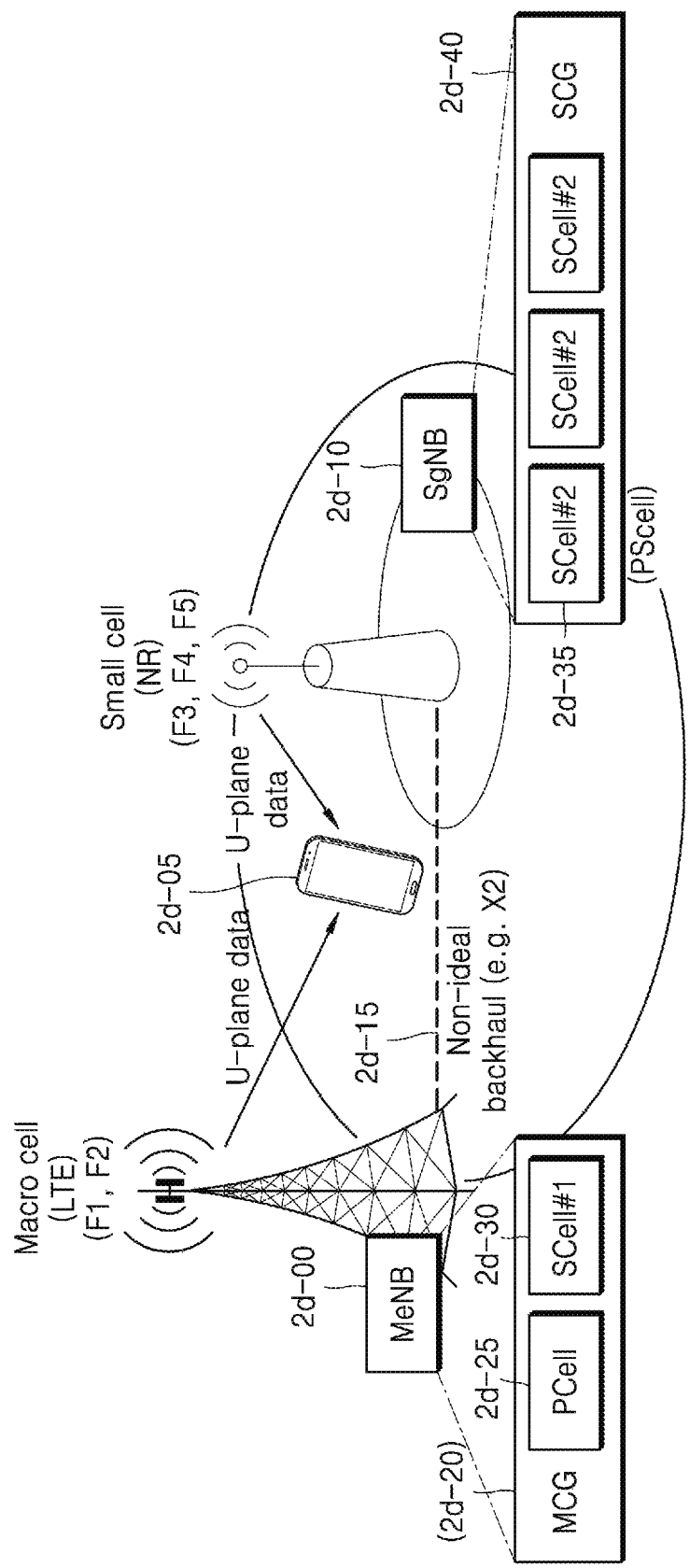
FIG. 2D is a diagram for describing the concept of dual connectivity (DC) in LTE and NR, according to an embodiment of the disclosure.

FIG. 2D is a diagram for describing the concept of dual connectivity (DC) in LTE and NR, according to an embodiment of the disclosure.

A UE may be simultaneously connected to and use two base stations by using DC technology, and FIG. 2D illustrates a case in which a UE 2d-05 is simultaneously connected to and transmits and receives data to and from a macro base station 2d-00 using LTE technology and a small cell base station 2d-10 using NR technology. Such connectivity illustrated in FIG. 2D is called E-UTRAN-NR dual connectivity (EN-DC). The macro base station 2d-00 is called a master E-UTRAN nodeB (MeNB), and the small cell base station 2d-10 is called a secondary 5G nodeB (SgNB). A plurality of small cells may be present in the coverage of the MeNB 2d-00, and the MeNB 2d-00 is connected to the SgNBs through a wired backhaul network 2d-15. A group of serving cells provided by the MeNB 2d-00 is called a master cell group (MCG) 2d-20, and one serving cell in the MCG 2d-20 needs to operate as a primary cell (PCell) 2d-25 having all existing cell functions such as connection establishment, connection re-establishment, and handover. In the PCell 2d-25, an uplink control channel has a PUCCH. A serving cell other than the PCell 2d-25 is called a secondary cell (SCell) 2d-30.

FIG. 2D illustrates a scenario in which the MeNB 2d-00 provides one SCell and the SgNB 2d-10 provides three SCells. A group of serving cells provided by the SgNB 2d-10 is called a secondary cell group (SCG) 2d-40. When the UE 2d-05 transmits or receives data to or from the two base stations 2d-00 and 2d-10, the MeNB 2d-00 transmits a command to the SgNB 2d-10 to add, change, or remove serving cells provided by the SgNB 2d-10. For the command, the MeNB 2d-00 may transmit configuration information to the UE 2d-05 to measure a serving cell and neighboring cells. The UE 2d-05 needs to report a measurement result to the MeNB 2d-00, based on the configuration information. For efficient data transmission and reception between the SgNB 2d-10 and the UE 2d-05, the SgNB 2d-10 requires a serving cell operating similarly to the PCell 2d-25 of the MCG 2d-20, and such a serving cell is called a primary SCell (PSCell). The PSCell 2d-35 is determined as one of the serving cells of the SCG 2d-40, and is characterized by having a PUCCH. The PUCCH is used when the UE 2d-05 transmits HARQ ACK/NACK information, channel status information (CSI), a scheduling request (SR), or the like to the SgNB 2d-10.

Figure 2E:
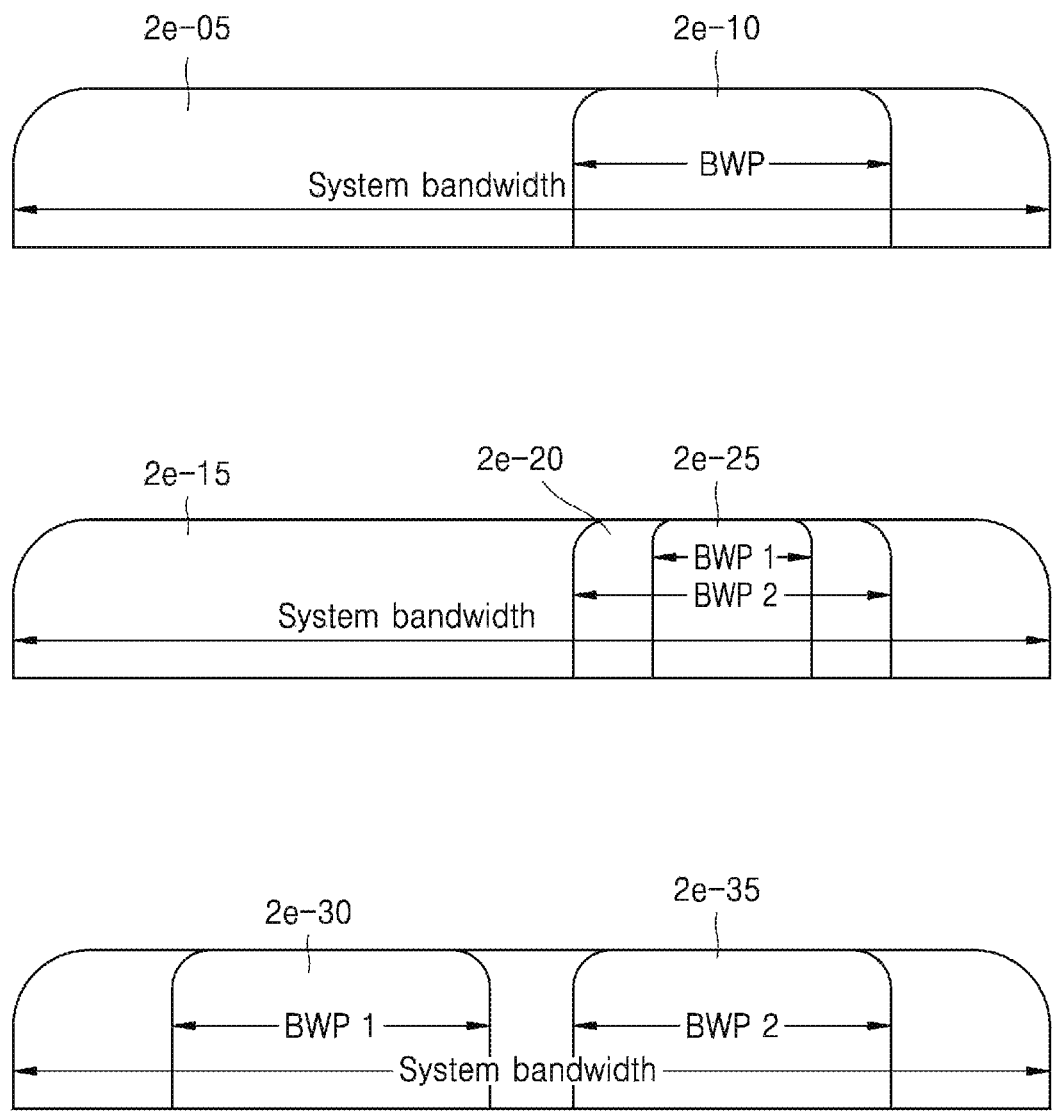
FIG. 2E is a diagram for describing scenarios of applying a bandwidth part (BWP) in an NR or 5G system, according to an embodiment of the disclosure.

FIG. 2E is a diagram for describing scenarios of applying a bandwidth part (BWP) in an NR or 5G system, according to an embodiment of the disclosure.

A BWP technology refers to a technology by which a UE performs communication by using only a part of a system bandwidth used by a cell. The BWP is used to reduce manufacturing costs and power consumption of UEs. The BWP may be configured by a base station for a UE supporting the same.

Referring to FIG. 2E, the following three BWP operating scenarios may be present. However, the BWP operating scenarios are not limited thereto.

Scenario 1 is to apply a BWP for a UE supporting only a frequency bandwidth 2e-10 narrower than a system bandwidth 2e-05 used by a cell. To reduce manufacturing costs, a specific UE may be developed to support a limited frequency bandwidth. The specific UE supporting the limited frequency bandwidth needs to report a base station that the UE supports only the limited frequency bandwidth, and thus the base station configures a BWP equal to or narrower than a maximum bandwidth supported by the UE.

Scenario 2 is to apply a BWP to reduce power consumption of a UE. For example, when a UE is performing communication by using the entirety of a system bandwidth 2e-15 used by a cell, or a BWP 2e-20 thereof, a base station may configure a narrower BWP 2e-25 to reduce power consumption.

Scenario 3 is to apply individual BWPs corresponding to different numerologies. Numerology refers to diversification of a physical layer configuration to achieve optimal data transmission based on various service requirements. For example, in an orthogonal frequency-division multiple access (OFDMA) structure including a plurality of subcarriers, a subcarrier spacing may be variably adjusted based on a certain requirement. A UE may perform communication by simultaneously applying a plurality of numerologies. In this case, physical layer configurations corresponding to the numerologies are different and thus the numerologies may be separately applied using individual BWPs, e.g., BWP 1 2e-30 and BWP 2 2e-35.

In the above-described scenarios, a base station may configure a plurality of BWPs for a UE and then activate a specific BWP among the configured BWPs. For example, in the scenario 3, the base station may configure the BWP 1 2e-30 and the BWP 2 2e-35 for the UE and activate one of the two BWPs 2e-30 and 2e-35. As such, in the above-described scenarios, the UE may transmit or receive data through an active BWP for DL or UL.

According to an embodiment of the disclosure, when a plurality of BWPs are configured, the UE may switch an active BWP, which is called BWP switching. BWP switching may be performed by assigning resources to a BWP to be switched, by using a physical downlink control channel (PDCCH) transmitted by the base station.

Figure 2F:
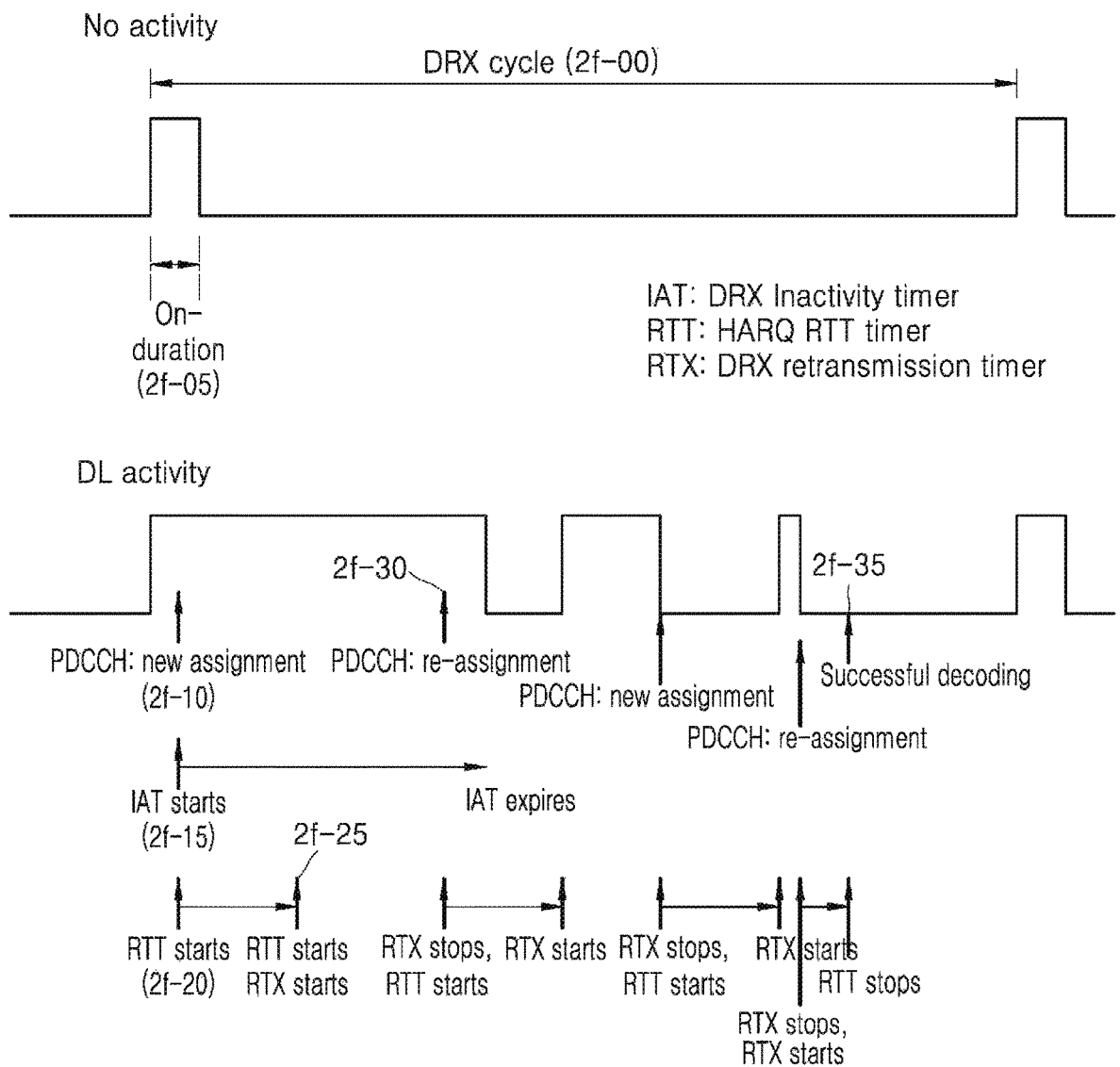
FIG. 2F is a diagram for describing a discontinuous reception (DRX) operation of a UE, according to an embodiment of the disclosure.

FIG. 2F is a diagram for describing a discontinuous reception (DRX) operation of a UE, according to an embodiment of the disclosure.

DRX refers to a technology for monitoring not all but only some PDCCHs carrying scheduling information, based on configuration information of a base station to minimize power consumption of a UE. Basically, in the DRX operation, PDCCH monitoring is performed with a DRX cycle 2f-00 during only an on-duration 2f-05. In a connected mode, two DRX cycles, e.g., a long DRX cycle and a short DRX cycle, are configured as the DRX cycle 2f-00. The long DRX cycle is generally applied and, when necessary, the base station may additionally configure the short DRX cycle.

According to an embodiment of the disclosure, when the long DRX cycle and the short DRX cycle are both configured, the UE preferentially starts a short DRX timer and repeats the short DRX cycle, and switches from the short DRX cycle to the long DRX cycle when no traffic is present after the short DRX timer expires. When scheduling information for a new packet is received by using a PDCCH during the on-duration 2f-05 (2f-10), the UE starts a DRX inactivity timer (2f-15). The UE remains active while the DRX inactivity timer is operating. That is, PDCCH monitoring is continued. The UE also starts a HARQ round trip time (RTT) timer (2f-20). The HARQ RTT timer is used to prevent unnecessary PDCCH monitoring of the UE during a HARQ RTT, and the UE does not need to perform PDCCH monitoring while the HARQ RTT timer is operating. However, the UE continues PDCCH monitoring based on the DRX inactivity timer while the DRX inactivity timer and the HARQ RTT timer are simultaneously operating. When the HARQ RTT timer expires, a DRX retransmission timer starts (2f-25). While the DRX retransmission timer is operating, the UE needs to perform PDCCH monitoring. In general, while the DRX retransmission timer is operating, scheduling information for HARQ retransmission is received (2f-30). When the scheduling information for HARQ retransmission is received, the UE stops the DRX retransmission timer and re-starts the HARQ RTT timer. The above-described operation is repeated until the packet is successfully received (2f-35). When the base station has no more data to be transmitted to the UE while an on-duration timer and the DRX inactivity timer are additionally operating, the base station may transmit a DRX command MAC CE message to the UE. The UE having received the DRX command MAC CE message stops both of the operating on-duration timer and DRX inactivity timer, and preferentially uses a short DRX cycle when the short DRX cycle is configured or uses a long DRX cycle when only the long DRX cycle is configured.

Figure 2G:
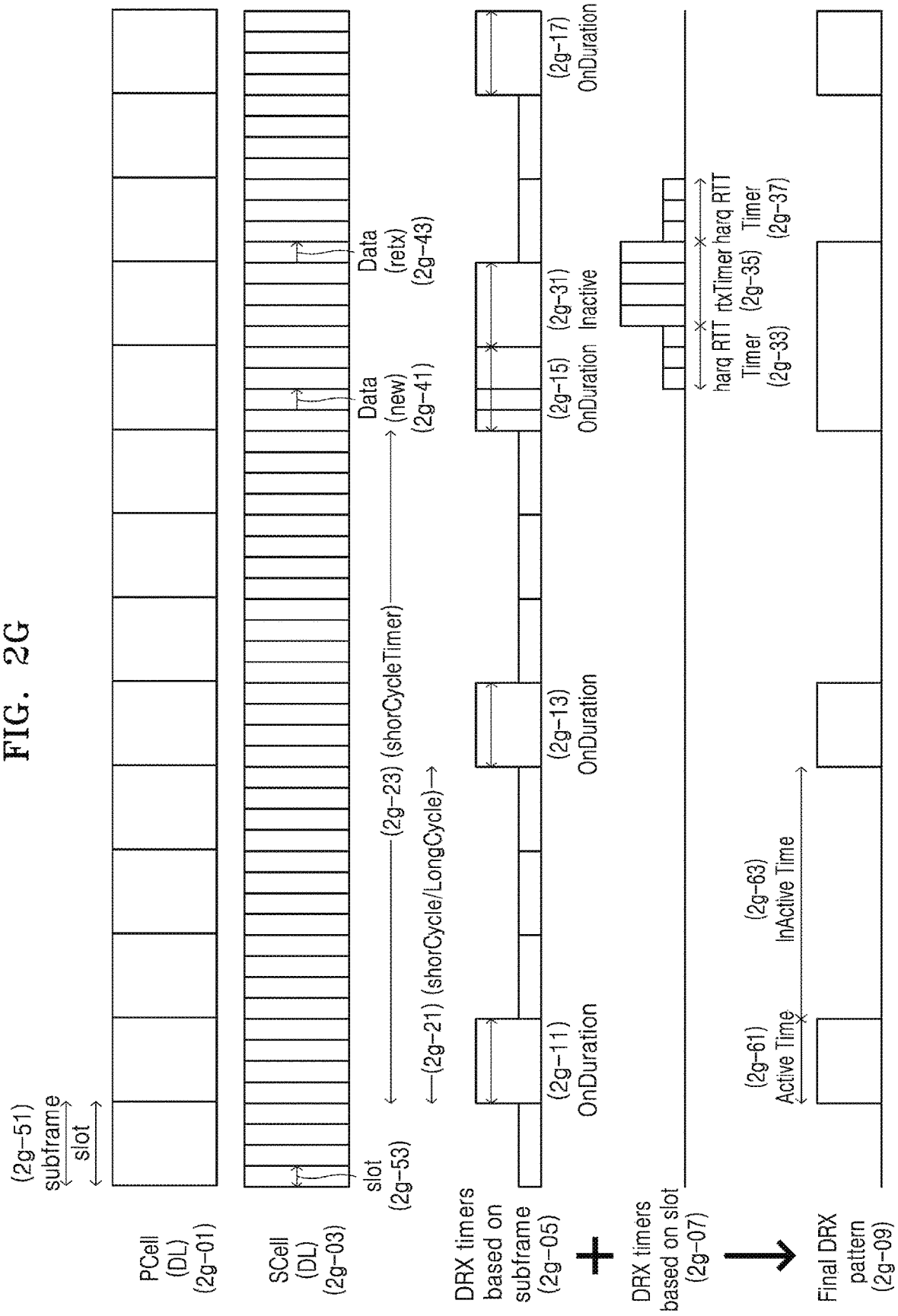
FIG. 2G is a timing diagram of a DRX operation with a plurality of transmission units, according to an embodiment of the disclosure.

FIG. 2G is a timing diagram of a DRX operation with a plurality of transmission units, according to an embodiment of the disclosure.

Referring to FIG. 2G, it is assumed that a UE is in an RRC_CONNECTED state to a base station and that the base station has additionally configured a SCell 2g-03 for the UE. The UE in the RRC_CONNECTED state may transmit and receive data to and from the base station.

When the SCell 2g-03 is configured for the UE, the base station configures a transmission unit of the SCell 2g-03 for the UE and a timer 2g-23 for DRX cycles. Herein, the transmission unit is representatively called a slot. Referring to FIG. 2G, it is assumed that a slot of a PCell 2g-01 has a duration 2g-51 of 1 ms equally to a subframe and that a slot of the SCell 2g-03 has a duration 2g-53 of ¼ (0.25) ms.

The base station may configure the above-described DRX operation for the UE to reduce power consumption of the UE. Timers used for DRX, and time units of the timers are described below. However, the timers and the time units are not limited thereto.
- On-duration timer: Configured to have an absolute time duration
- Short DRX cycle: Configured to have an absolute time duration
- Short DRX cycle timer: Configured to have a duration corresponding to the number of short DRX cycles
- Long DRX cycle: Configured to have an absolute time duration
- DRX inactivity timer: Configured to have an absolute time duration
- DL HARQ RTT timer: Configured to have a duration corresponding to the number of slots based on a reference slot duration
- UL HARQ RTT timer: Configured to have a duration corresponding to the number of slots based on a reference slot duration
- DL DRX retransmission timer: Configured to have a duration corresponding to the number of slots based on a reference slot duration
- UL DRX retransmission timer: Configured to have a duration corresponding to the number of slots based on a reference slot duration The reference slot duration may include the following two cases. However, the reference slot duration is not limited thereto.
- A slot duration based on a subcarrier spacing of a specific BWP (e.g., BWP identifier #0) of a specific serving cell (determined depending on a base station to which DRX operates (e.g., a PCell for a MCG, or a PSCell for a SCG))
- A slot duration based on a subcarrier spacing of a currently active DL or UL BWP of a cell to which transmission or retransmission is performed In the above-described two cases, for example, the slot duration is 1 ms when the subcarrier spacing of the corresponding BWP is 15 kHz, is 0.5 ms when the subcarrier spacing is 30 kHz, is 0.25 ms when the subcarrier spacing is 60 kHz, and is 0.125 ms when the subcarrier spacing is 120 kHz.

In the above-described scenarios, BWP switching may occur while the timers configured based on the reference slot duration are operating. As such, the slot duration may be updated in the above-described scenario 3 of FIG. 2E. At this time, the durations of the timers configured based on the reference slot duration may be determined using one of the following four schemes.
- Scheme 1: An absolute time duration of a timer may be determined when the timer starts.
- For example, when the timer starts during operation at 15 kHz and then switching to 30 kHz occurs after 2 slots, and when a duration of the timer corresponds to 4 slots, 1 ms*4=4 ms may be determined.
- According to this scheme, although BWP switching occurs while the timer is operating, the UE does not need to re-calculate the duration of the timer and thus simple implementation may be achieved.
- Scheme 2: A timer duration may be determined as the number of slots and thus a duration of remaining slots after BWP switching may be determined based on a slot duration of a switched BWP.
- For example, when the timer starts during operation at 15 kHz and then switching to 30 kHz occurs after 2 slots, and when a duration of the timer corresponds to 4 slots, 1 ms*2 (before switching)+0.5 ms*2=3 ms may be determined.
- According to this scheme, by adjusting the timer duration based on the slot duration of the switched BWP, the timer duration may be updated based on a corresponding numerology and thus latency may be minimized.
- Scheme 3: When a slot duration is updated due to BWP switching, a timer corresponding thereto may be stopped (or interrupted).
- According to this scheme, simple implementation may be achieved. (However, a PDCCH may be received during remaining slots or PDCCH reception may be started early, and thus power may be wasted.)

Scheme 4: When a slot duration is updated due to BWP switching, a timer corresponding thereto may be re-started and a duration of the re-started timer may be updated based on a slot duration according to a sub-carrier spacing of the switched DL or UL BWP.

For example, when the timer starts during operation at 15 kHz and then switching to 30 kHz occurs after 2 slots, and when a duration of the timer corresponds to 4 slots, 1 ms*2 (before switching)+0.5 ms*4=4 ms may be determined.

According to this scheme, by re-starting the timer when BWP switching occurs, the timer may have a sufficient duration.

The UE for which DRX is configured repeats a configured cycle 2g-21 and performs PDCCH monitoring during every on-duration (2g-11), (2g-13), (2g-15), and (2g-17) as shown in pattern 2g-05. When the base station transmits data to the UE during a certain on-duration (2g-41), the UE operates a HARQ RTT timer and a time unit in this case is based on the number of slots 2g-53 of the scheduled serving cell 2g-03. Herein, the time unit is assumed as 3 slots (2g-33) as shown in pattern 2g-07. The data is received during the on-duration and thus the UE determines whether additional new data is received, by operating a DRX inactivity timer (2g-31). When the HARQ RTT timer expires, the UE operates a DRX retransmission timer and performs PDCCH monitoring while the DRX retransmission timer is operating (2g-35). When retransmission is scheduled for the UE by using a PDCCH (2g-43), the UE stops the operating DRX retrans-mission timer and re-operates the HARQ RTT timer (2g-37). Thereafter, when the UE determines that corresponding HARQ retransmission is successfully completed before the HARQ RTT timer expires, the UE no longer operates the DRX retransmission timer. As illustrated in FIG. 2G, retransmission appropriate for each transmission unit may be performed by operating the HARQ RTT timer and the DRX retransmission timer related to HARQ retransmission, based on a duration configured in slot units of a cell to which transmission and retransmission is performed.

An active time 2g-61 for which the UE actually performs PDCCH monitoring and data transmission and reception based on operations of all timers, and an inactive time 2g-63 may be expressed as a pattern 2g-09.

Figure 2H:
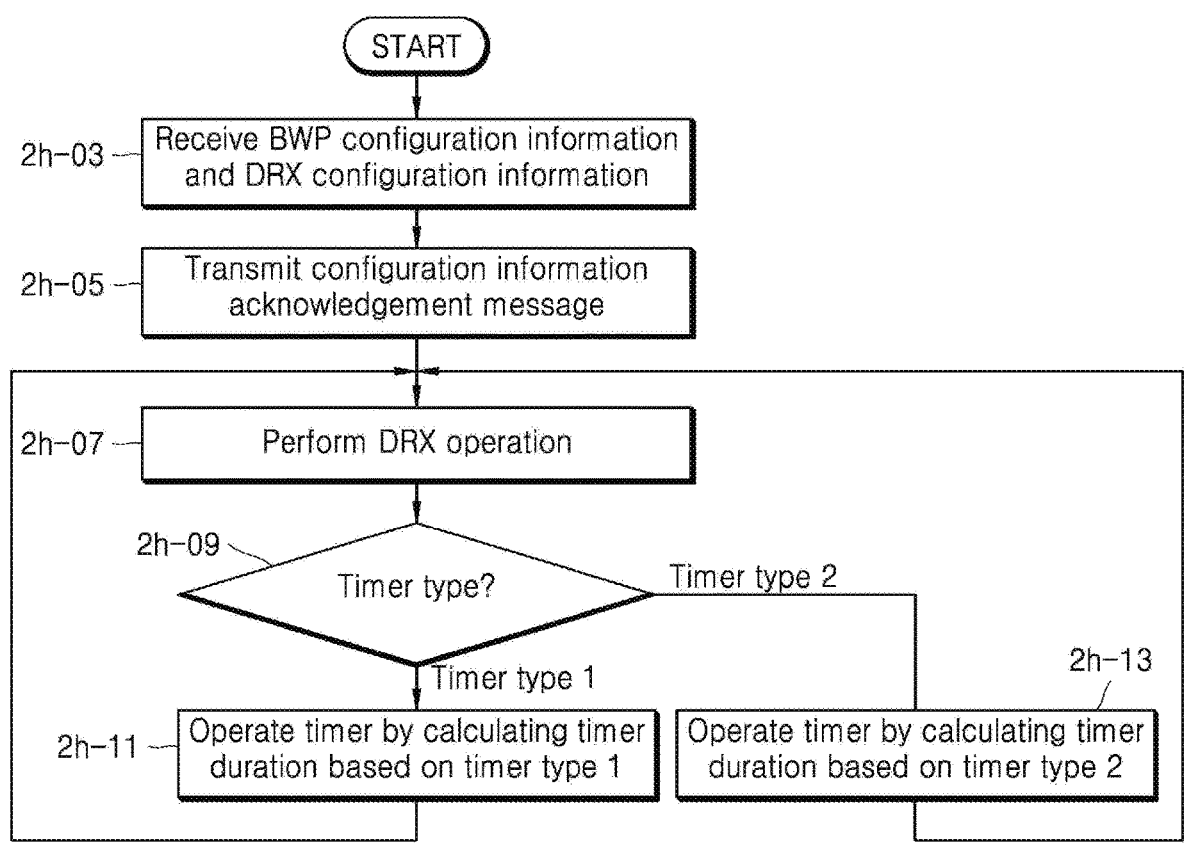
FIG. 2H is a flowchart for describing a procedure of a DRX operation of a UE in a wireless communication system using a BWP, according to an embodiment of the disclosure.

FIG. 2H is a flowchart for describing a DRX operation of a UE in a wireless communication system using a BWP, according to an embodiment of the disclosure.

Referring to FIG. 2H, it is assumed that the UE has accessed a base station and is in an RRC_CONNECTED state capable of enabling data transmission and reception. Thereafter, the UE may receive, from the base station, BWP configuration information indicating a plurality of UE-spe-cific BWPs and activation of a specific BWP among the configured BWPs, based on capability of the UE, and more particularly, for example, maximum bandwidth information supported by the UE (2h-03). Furthermore, one of the configured BWPs may be designated as a default BWP. When the default BWP is not designated, an initial access BWP obtained to access the base station may be determined as a default BWP. In addition to the BWP configuration information, the UE may receive, from the base station, DRX configuration information indicating, for example, durations of the above-described DRX-related timers (2h-03). The BWP configuration information may be transmitted using an RRCReconfiguration message of an RRC layer.

The UE having received the RRCReconfiguration mes-sage transmits an acknowledgement message indicating successful reception, and such a message may be transmitted using an RRCReconfigurationComplete message of an RRC layer (2h-05).

The UE having received at least one of the BWP con-figuration information or the DRX configuration informa-tion performs the above-described DRX operation and oper-ates the DRX-related timers described above in relation to FIGS. 2F and 2G, to control PDCCH reception timings of the UE (2h-07). In this case, the UE operates at least one timer by configuring a different timer duration depending on the type of the operating timer (2h-09).

That is, when a condition for operating timers correspond-ing to timer type 1 is met, the UE operates the timer for a time having an absolute duration configured through an RRC layer (2h-11). The timer type 1 indicates DRX-related timers configured to have absolute time durations, e.g., an on-duration timer, a short DRX cycle, a long DRX cycle, and a DRX inactivity timer.

Otherwise, when a condition for operating timers corre-sponding to timer type 2 is met, the UE operates the timer for a time having a duration corresponding to the number of slots based on a reference slot duration (2h-13).

The reference slot duration may include the following two cases. However, the reference slot duration is not limited thereto.

A slot duration based on a subcarrier spacing of a specific BWP (e.g., BWP identifier #0) of a specific serving cell (determined depending on a base station to which DRX operates (e.g., a PCell for a MCG, or a PSCell for a SCG))

A slot duration based on a subcarrier spacing of a cur-rently active DL or UL BWP of a cell to which transmission or retransmission is performed In the above-described two cases, for example, the slot duration is 1 ms when the subcarrier spacing of the corre-sponding BWP is 15 kHz, is 0.5 ms when the subcarrier spacing is 30 kHz, is 0.25 ms when the subcarrier spacing is 60 kHz, and is 0.125 ms when the subcarrier spacing is 120 kHz.

In the above-described scenarios, BWP switching may occur while the timers configured based on the reference slot duration are operating. As such, the slot duration may be updated in the above-described scenario 3 of FIG. 2E. At this time, the durations of the timers configured based on the reference slot duration may be determined using one of the following four schemes.

Scheme 1: An absolute time duration of a timer may be determined when the timer starts.

For example, when the timer starts during operation at 15 kHz and then switching to 30 kHz occurs after 2 slots, and when a duration of the timer corresponds to 4 slots, 1 ms*4=4 ms may be determined.

According to this scheme, although BWP switching occurs while the timer is operating, the UE does not need to re-calculate the duration of the timer and thus simple implementation may be achieved.

Scheme 2: A timer duration may be determined as the number of slots and thus a duration of remaining slots after BWP switching may be determined based on a slot duration of a switched BWP.

For example, when the timer starts during operation at 15 kHz and then switching to 30 kHz occurs after 2 slots, and when a duration of the timer corresponds to 4 slots, 1 ms*2 (before switching)+0.5 ms*2=3 ms may be determined.

According to this scheme, by adjusting the timer duration based on the slot duration of the switched BWP, the timer duration may be updated based on a corresponding numerology and thus latency may be minimized.

Scheme 3: When a slot duration is updated due to BWP switching, a timer corresponding thereto may be stopped (or interrupted).

According to this scheme, simple implementation may be achieved. (However, a PDCCH may be received during remaining slots or PDCCH reception may be started early, and thus power may be wasted.)

Scheme 4: When a slot duration is updated due to BWP switching, a timer corresponding thereto may be re-started and a duration of the re-started timer may be updated based on a slot duration according to a sub-carrier spacing of the switched DL or UL BWP.

For example, when the timer starts during operation at 15 kHz and then switching to 30 kHz occurs after 2 slots, and when a duration of the timer corresponds to 4 slots, 1 ms*2 (before switching)+0.5 ms*4=4 ms may be determined.

According to this scheme, by re-starting the timer when BWP switching occurs, the timer may have a sufficient duration.

Due to the above-described operation, even when BWP switching occurs during the DRX operation, the UE may transmit or receive data to or from the base station by adjusting a PDCCH reception time based on, for example, the above-described method.

Figure 2I:
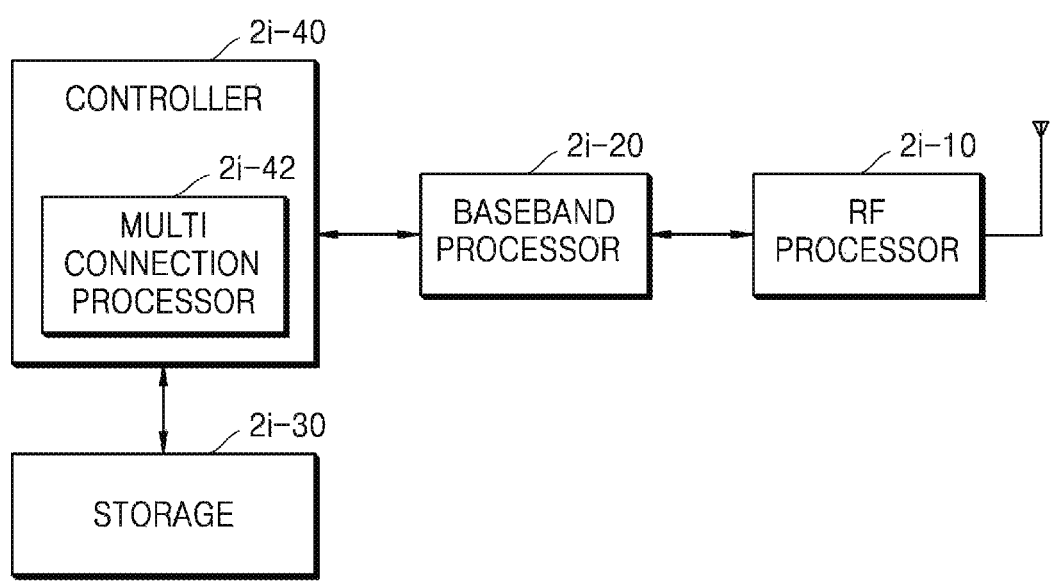
FIG. 2I is a block diagram of a UE in a wireless communication system, according to an embodiment of the disclosure.

FIG. 2I is a block diagram of a UE in a wireless communication system, according to an embodiment of the disclosure.

Referring to FIG. 2I, the UE includes an RF processor 2*i*-10, a baseband processor 2*i*-20, a storage 2*i*-30, and a controller 2*i*-40. However, the UE is not limited thereto and may include a smaller or larger number of elements compared to those illustrated in FIG. 2I. The UE of FIG. 2I may be the same as the UE described above in relation to FIG. 1E.

The RF processor 2*i*-10 may perform functions for transmitting and receiving signals through wireless channels, e.g., band conversion and amplification of the signals. That is, the RF processor 2*i*-10 may up-convert a baseband signal provided from the baseband processor 2*i*-20, into an RF band signal and then transmit the RF band signal through an antenna, and down-convert an RF band signal received through the antenna, into a baseband signal. For example, the RF processor 2*i*-10 may include a transmit filter, a receive filter, an amplifier, a mixer, an oscillator, a DAC, and an ADC. However, the RF processor 2*i*-10 is not limited thereto. Although only one antenna is illustrated in FIG. 2I, the UE may include a plurality of antennas. The RF processor 2*i*-10 may include a plurality of RF chains. The RF processor 2*i*-10 may perform beamforming. For beamforming, the RF processor 2*i*-10 may adjust phases and intensities of signals to be transmitted or received through a plurality of antennas or antenna elements. The RF processor 2*i*-10 may perform MIMO and receive data of a plurality of layers in the MIMO operation. The RF processor 2*i*-10 may perform received beam sweeping by appropriately configuring a plurality of antennas or antenna elements, or adjust a direction and a beam width of a received beam to coordinate with a transmit beam, under the control of the controller 2*i*-40.

The baseband processor 2*i*-20 may convert between a baseband signal and a bitstream based on physical layer specifications of a system. For example, for data transmission, the baseband processor 2*i*-20 may generate complex symbols by encoding and modulating a transmit bitstream. For data reception, the baseband processor 2*i*-20 may reconstruct a received bitstream by demodulating and decoding a baseband signal provided from the RF processor 2*i*-10. For example, according to an OFDM scheme, for data transmission, the baseband processor 2*i*-20 generates complex symbols by encoding and modulating a transmit bitstream, maps the complex symbols to subcarriers, and then configures OFDM symbols by performing IFFT and CP insertion. For data reception, the baseband processor 2*i*-20 may segment a baseband signal provided from the RF processor 2*i*-10, into OFDM symbol units, reconstruct signals mapped to subcarriers by performing FFT, and then reconstruct a received bitstream by demodulating and decoding the signals.

The baseband processor 2*i*-20 and the RF processor 2*i*-10 transmit and receive signals as described above. The baseband processor 2*i*-20 and the RF processor 2*i*-10 may also be called a transmitter, a receiver, a transceiver, or a communicator. At least one of the baseband processor 2*i*-20 or the RF processor 2*i*-10 may include a plurality of communication modules to support a plurality of different radio access technologies. At least one of the baseband processor 2*i*-20 or the RF processor 2*i*-10 may include different communication modules to process signals of different frequency bands. For example, the different radio access technologies may include a wireless LAN (e.g., IEEE 802.11) and a cellular network (e.g., an LTE network). The different frequency bands may include a SHF (e.g., 2.5 GHz or 5 GHz) band and a mmWave (e.g., 60 GHz) band. The UE may transmit and receive signals to and from a base station by using the baseband processor 2*i*-20 and the RF processor 2*i*-10, and the signals may include control information and data.

The storage 2*i*-30 stores basic programs, application programs, and data, e.g., configuration information, for operations of the UE. In particular, the storage 2*i*-30 may store information about a wireless LAN node performing wireless communication by using a wireless LAN access technology. The storage 2*i*-30 provides the stored data upon request by the controller 2*i*-40. The storage 2*i*-30 may include any or a combination of storage media such as ROM, RAM, a hard disk, a CD-ROM, and a DVD. The storage 2*i*-30 may include a plurality of memories. According to an embodiment of the disclosure, the storage 2*i*-30 may store a program for executing a DRX operation based on BWP configuration information and DRX configuration information of the disclosure.

The controller 2*i*-40 controls overall operations of the UE. For example, the controller 2*i*-40 transmits and receives signals through the baseband processor 2*i*-20 and the RF processor 2*i*-10. The controller 2*i*-40 records and reads data on or from the storage 2*i*-30. In this regard, the controller 2*i*-40 may include at least one processor. For example, the controller 2*i*-40 may include a CP for controlling communications and an AP for controlling an upper layer such as an application program. According to an embodiment of the disclosure, the controller 2*i*-40 may include a dual connectivity processor 2*i*-42 for performing processing to operate in a dual connectivity mode. For example, the controller 2*i*-40 may control the UE to perform the procedure of the UE operation illustrated in FIG. 2H. At least one element in the UE may be configured in the form of a chip.

The controller 2*i*-40 according to an embodiment of the disclosure performs a DRX operation based on configuration information received from the base station, by determining a slot duration based on a currently active DL BWP, and maintaining or updating a timer duration according to the afore-described embodiments of the disclosure when BWP switching occurs.

Figure 2J:
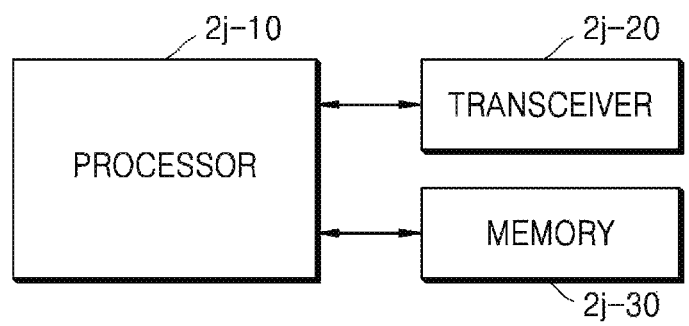
FIG. 2J is a block diagram of a base station in a wireless communication system, according to an embodiment of the disclosure.

FIG. 2J is a block diagram of a base station in a wireless communication system, according to an embodiment of the disclosure.

Referring to FIG. 2J, the base station may include a processor 2j-10, a transceiver 2j-20, and a memory 2j-30. The processor 2j-10, the transceiver 2j-20, and the memory 2j-30 of the base station may operate based on the above-described base station communication method. However, the base station is not limited to the above-mentioned elements. For example, the base station may include a larger or smaller number of elements compared to the above-mentioned elements. The processor 2j-10, the transceiver 2j-20, and the memory 2j-30 may be configured in the form of a chip. At least one processor 2j-10 may be included. The base station of FIG. 2J may have the same structure as but be illustrated as a different block diagram from the base station described above in relation to FIG. 1F.

The transceiver 2j-20 collectively refers to an RF processor and a baseband processor of the base station, and may include a backhaul communicator of the base station. The transceiver 2j-20 may transmit and receive signals to and from a UE. The signals may include control information and data. The RF processor may include, for example, an RF transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver 2j-20 are not limited thereto. The transceiver 2j-20 may receive a signal through a wireless channel and output the signal to the processor 2j-10, and transmit a signal output from the processor 2j-10, through a wireless channel.

The processor 2j-10 may control a series of procedures to operate the base station according to the afore-described embodiments of the disclosure. For example, the transceiver 2j-20 may receive a data signal including a control signal, which are transmitted from the UE, and the processor 2j-10 may determine a result of receiving the control signal and the data signal transmitted from the UE.

The memory 2j-30 may store a program and data required for operation of the base station. The memory 2j-30 may store control information or data included in a signal obtained by the base station. The memory 2j-30 may include any or a combination of storage media such as ROM, RAM, a hard disk, a CD-ROM, and a DVD. The memory 2j-30 may store a program for performing the above-described operation of the base station.

According to the afore-described embodiments of the disclosure, an apparatus and method capable of effectively providing services in a mobile communication system may be provided.

The methods according to the various embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the various embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

While the disclosure has been shown and described with reference to various embodiments thereof, it will be understood by those skilled in the art that various changes in forms and details may be made therein without departing from the scope of the disclosure of the disclosure as defined by the appended claims and their equivalents.

The various embodiments of the disclosure may operate in combination as necessary. For example, a base station and a UE may operate according to a combination of parts of the methods according to various embodiments of the disclosure. Although the various embodiments of the disclosure have been described on the basis of a 5G or NR system, modifications thereof based on the technical aspects of the various embodiments of the disclosure are applicable to other systems such as LTE, LTE-A, and LTE-A-Pro systems.

What is claimed is:

1. A method of performing a discontinuous reception (DRX) operation by a user equipment (UE), the method comprising: receiving, from a base station, bandwidth part (BWP) configuration information and DRX configuration information; configuring a duration of a timer for the DRX operation based on the BWP configuration information and the DRX configuration information; and controlling the timer to perform the DRX operation based on the configured duration, wherein the duration of the timer is configured based on a number of reference slots, wherein the reference slots has a slot length corresponding to a BWP of a primary cell (PCell) or a primary secondary cell (PSCell) with BWP identifier 0, and wherein if a BWP switching is indicated while the timer is running, the duration of the timer is updated after the BWP switching based on a slot length corresponding to a switched BWP.

2. The method of claim 1, wherein the timer comprises at least one of a drx-RetransmissionTimerDL or a drx-RetransmissionTimerUL.

3. The method of claim 1, wherein in case that the base station is related to a master cell group (MCG), the slot length of the reference slots corresponds to a BWP of the PCell with BWP identifier 0, and wherein in case that the base station is related to a secondary cell group (SCG), the slot length of the reference slots corresponds to a BWP of the PSCell with BWP identifier 0.

4. The method of claim 1, further comprising: receiving a physical downlink control channel (PDCCH) for a—the BWP switching; and performing the BWP switching based on the PDCCH.

5. A method of performing a discontinuous reception (DRX) operation by a base station, the method comprising: transmitting bandwidth part (BWP) configuration information and DRX configuration information to a user equipment (UE); and transmitting a physical downlink control channel (PDCCH) to the UE based on a duration of a timer of the UE, the duration being configured based on the BWP configuration information and the DRX configuration information, wherein the duration of the timer is configured based on a number of reference slots, wherein the reference slots has a slot length corresponding to a BWP of a primary cell (PCell) or a primary secondary cell (PSCell) with BWP identifier 0, and wherein if a BWP switching is indicated while the timer is running, the duration of the timer is updated after the BWP switching based on a slot length corresponding to a switched BWP.

6. The method of claim 5, wherein the timer comprises at least one of a drx-RetransmissionTimerDL or a drx-RetransmissionTimerUL.

7. A user equipment (UE) for performing a discontinuous reception (DRX) operation, the UE comprising: a transceiver; and a controller coupled with the transceiver and configured to: receive, from a base station, bandwidth part (BWP) configuration information and DRX configuration information, configure a duration of a timer for the DRX operation based on the BWP configuration information and the DRX configuration information, and control the timer to perform the DRX operation based on the configured duration, wherein a duration of the timer is configured based on a number of reference slots, wherein the reference slots has a slot length corresponding to a BWP of a primary cell (PCell) or a primary secondary cell (PSCell) with BWP identifier 0, and wherein if a BWP switching is indicated while the timer is running, the duration of the timer is updated after the BWP switching based on a slot length corresponding to a switched BWP.

8. The UE of claim 7, wherein the timer comprises at least one of a drx-RetransmissionTimerDL or a drx-RetransmissionTimerUL.

9. The UE of claim 7, wherein in case that the base station is related to a master cell group (MCG), the slot length of the reference slots corresponds to a BWP of the PCell with BWP identifier 0, and wherein in case that the base station is related to a secondary cell group (SCG), the slot length of the reference slots corresponds to a BWP of the PSCell with BWP identifier 0.

10. The UE of claim 7, wherein the controller is further configured to: receive a physical downlink control channel (PDCCH) for s—the BWP switching, and perform the BWP switching based on the PDCCH.

11. A base station for performing a discontinuous reception (DRX) operation, the base station comprising: a transceiver; and a controller coupled with the transceiver and configured to: transmit bandwidth part (BWP) configuration information and DRX configuration information to a user equipment (UE), and transmit a physical downlink control channel (PDCCH) to the UE based on a duration of a timer of the UE, the duration being configured based on the BWP configuration information and the DRX configuration information, wherein a duration of the timer is configured based on a number of reference slots, wherein the reference slots has a slot length corresponding to a BWP of a primary cell (PCell) or a primary secondary cell (PSCell) with BWP identifier 0, and wherein if a BWP switching is indicated while the timer is running, the duration of the timer is updated after the BWP switching based on a slot length corresponding to a switched BWP.

12. The base station of claim 11, wherein the timer comprises at least one of a drx-RetransmissionTimerDL or a drx-RetransmissionTimerUL.

* * * * *